(12) United States Patent
Swink et al.

(10) Patent No.: US 9,600,141 B2
(45) Date of Patent: Mar. 21, 2017

(54) SYSTEMS, APPARATUS, METHODS AND COMPUTER-READABLE STORAGE MEDIA FACILITATING INFORMATION RETRIEVAL FOR A COMMUNICATION DEVICE

(75) Inventors: Cristy Swink, Milton, GA (US); Jason Sikes, Carnation, WA (US); Benjamin Fineman, San Francisco, CA (US); Jonathan Solis Snydal, Oakland, CA (US); Megan Elisabeth Shia, San Francisco, CA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 125 days.

(21) Appl. No.: 12/903,632

(22) Filed: Oct. 13, 2010

(65) Prior Publication Data
US 2011/0087994 A1    Apr. 14, 2011

Related U.S. Application Data

(60) Provisional application No. 61/251,717, filed on Oct. 14, 2009.

(51) Int. Cl.
*G06F 3/0482* (2013.01)
*H04L 12/58* (2006.01)
(Continued)

(52) U.S. Cl.
CPC ............ *G06F 3/0482* (2013.01); *H04L 51/16* (2013.01); *H04L 51/32* (2013.01); *H04L 51/36* (2013.01);
(Continued)

(58) Field of Classification Search
CPC ............. G06F 3/0482; G06F 17/30017; G06F 3/04842; G06Q 50/01; G06Q 10/107
(Continued)

(56) References Cited

U.S. PATENT DOCUMENTS 5,072,412 A    12/1991    Henderson, Jr. et al.
5,233,687 A    8/1993    Henderson, Jr. et al.
(Continued)

FOREIGN PATENT DOCUMENTS

WO    2008107675    9/2008

OTHER PUBLICATIONS

"Global Framework—UE Flows and Screen Details". AT&T Armstrong Project. Version 1.10. Last accessed Jun. 16, 2010, 166 pages.
(Continued)

*Primary Examiner* — Christopher J Fibbi
(74) *Attorney, Agent, or Firm* — Amin, Turocy & Watson, LLP

(57) ABSTRACT

Systems, apparatus, methods and computer-readable media are provided. In some embodiments, a method can include: detecting a selection of an item, the item being displayed via user interface (UI); searching for information associated with the item for which selection is detected, wherein the searching is performed automatically based, at least, upon the detecting the selection of the item; and displaying search results, via the UI, wherein the displaying the search results is performed automatically during the selection of the item. In some embodiments, the search results comprise at least one of: a voicemail, a number of voicemails, messaging details, a portion of text, contacts information or social media information associated with the item for which selection is detected.

19 Claims, 10 Drawing Sheets

(51) Int. Cl.
  *H04M 1/725* (2006.01)
  *H04W 4/12* (2009.01)
  *H04W 4/14* (2009.01)
  *G06Q 50/00* (2012.01)

(52) U.S. Cl.
  CPC ..... *H04M 1/7255* (2013.01); *H04M 1/72552* (2013.01); *H04M 1/72555* (2013.01); *H04W 4/12* (2013.01); *H04W 4/14* (2013.01); *G06Q 50/01* (2013.01); *H04L 51/28* (2013.01)

(58) Field of Classification Search
  USPC ................................ 715/810; 707/770, 706
  See application file for complete search history.

(56) References Cited

U.S. PATENT DOCUMENTS

| | | |
|---|---|---|
| 5,394,521 A | 2/1995 | Henderson, Jr. et al. |
| 5,838,326 A | 11/1998 | Card et al. |
| 5,847,709 A | 12/1998 | Card et al. |
| 6,269,369 B1 | 7/2001 | Robertson |
| 6,367,020 B1 | 4/2002 | Klein |
| 6,401,209 B1 | 6/2002 | Klein |
| 7,269,727 B1 | 9/2007 | Mukherjee et al. |
| 7,286,063 B2 | 10/2007 | Gauthey et al. |
| 7,308,926 B1 | 12/2007 | Hawkins |
| 7,322,626 B2 | 1/2008 | Thomas |
| 7,324,333 B2 | 1/2008 | Allen |
| 7,376,669 B2 | 5/2008 | Klein |
| 7,443,665 B2 | 10/2008 | Allen |
| 7,453,443 B2 | 11/2008 | Rytivaara et al. |
| 7,478,436 B1 | 1/2009 | Shieh et al. |
| 7,606,024 B2 | 10/2009 | Boss et al. |
| 7,620,982 B2 | 11/2009 | Ishidera |
| 7,628,335 B2 | 12/2009 | Morimoto et al. |
| 7,636,033 B2 | 12/2009 | Golden |
| 7,640,293 B2 | 12/2009 | Wilson et al. |
| 7,657,849 B2 | 2/2010 | Chaudhri et al. |
| 7,761,814 B2 | 7/2010 | Rimas-Ribikauskas et al. |
| 7,933,609 B2 | 4/2011 | Lagerstedt et al. |
| 7,953,859 B1 | 5/2011 | Kiefhaber et al. |
| 8,108,781 B2 * | 1/2012 | Laansoo ........... G06F 17/30551 715/748 |
| 8,316,095 B1 | 11/2012 | Wheeler et al. |
| 8,484,564 B1 | 7/2013 | Marti et al. |
| 8,543,927 B1 | 9/2013 | McKinley et al. |
| 8,676,901 B1 | 3/2014 | Nicolaou et al. |
| 2001/0044903 A1 | 11/2001 | Yamamoto et al. |
| 2002/0056046 A1 | 5/2002 | Klein |
| 2002/0077079 A1 | 6/2002 | Ishihara |
| 2002/0099960 A1 | 7/2002 | Klein |
| 2002/0114654 A1 | 8/2002 | Abe et al. |
| 2003/0023688 A1 * | 1/2003 | Denenberg et al. .......... 709/206 |
| 2003/0025840 A1 | 2/2003 | Arling |
| 2003/0074575 A1 | 4/2003 | Hoberock et al. |
| 2003/0074590 A1 | 4/2003 | Fogle et al. |
| 2003/0120957 A1 | 6/2003 | Pathiyal |
| 2003/0172495 A1 | 9/2003 | Pan |
| 2003/0184592 A1 | 10/2003 | Awada et al. |
| 2003/0191960 A1 | 10/2003 | Hung-yi |
| 2003/0206224 A1 | 11/2003 | Sakakibara et al. |
| 2004/0034561 A1 | 2/2004 | Smith |
| 2004/0046018 A1 | 3/2004 | Dobbins |
| 2004/0082322 A1 | 4/2004 | Tani |
| 2004/0085351 A1 | 5/2004 | Tokkonen |
| 2004/0092247 A1 | 5/2004 | Tani |
| 2004/0113491 A1 | 6/2004 | Mauser |
| 2004/0113819 A1 | 6/2004 | Gauthey |
| 2004/0123135 A1 | 6/2004 | Goddard |
| 2004/0137884 A1 | 7/2004 | Engstrom et al. |
| 2004/0189439 A1 | 9/2004 | Cansino |
| 2004/0220913 A1 | 11/2004 | Walker |
| 2005/0085215 A1 | 4/2005 | Kokko et al. |
| 2005/0117564 A1 | 6/2005 | Vieri et al. |
| 2005/0234910 A1 * | 10/2005 | Buchheit et al. ................ 707/9 |
| 2005/0253817 A1 | 11/2005 | Rytivaara et al. |
| 2005/0282135 A1 | 12/2005 | Berman |
| 2006/0012577 A1 | 1/2006 | Kyrola |
| 2006/0052091 A1 | 3/2006 | Onyon et al. |
| 2006/0075250 A1 | 4/2006 | Liao |
| 2006/0101350 A1 * | 5/2006 | Scott ..................... G06F 3/0481 715/779 |
| 2006/0123347 A1 | 6/2006 | Hewitt et al. |
| 2006/0176661 A1 | 8/2006 | Allen |
| 2006/0184351 A1 | 8/2006 | Corston-Oliver et al. |
| 2006/0195474 A1 | 8/2006 | Cadiz et al. |
| 2006/0253371 A1 | 11/2006 | Rutt et al. |
| 2006/0255907 A1 | 11/2006 | Min |
| 2006/0271526 A1 | 11/2006 | Charnock et al. |
| 2006/0282772 A1 | 12/2006 | Chamberlin et al. |
| 2006/0291157 A1 | 12/2006 | Allen |
| 2006/0291158 A1 | 12/2006 | Allen |
| 2007/0022163 A1 | 1/2007 | Wormald et al. |
| 2007/0085839 A1 | 4/2007 | Yang et al. |
| 2007/0088687 A1 * | 4/2007 | Bromm et al. ................... 707/4 |
| 2007/0119952 A1 | 5/2007 | Morimoto et al. |
| 2007/0133771 A1 | 6/2007 | Stifelman et al. |
| 2007/0133802 A1 | 6/2007 | Yuan |
| 2007/0135091 A1 | 6/2007 | Wassingbo |
| 2007/0144225 A1 | 6/2007 | Tamura |
| 2007/0150842 A1 | 6/2007 | Chaudhri et al. |
| 2007/0161410 A1 | 7/2007 | Huang et al. |
| 2007/0203982 A1 | 8/2007 | Jagoe et al. |
| 2007/0204064 A1 | 8/2007 | Mail et al. |
| 2007/0220542 A1 | 9/2007 | Kim |
| 2007/0247276 A1 | 10/2007 | Murchison et al. |
| 2007/0274300 A1 | 11/2007 | Chu et al. |
| 2007/0282839 A1 | 12/2007 | Walker |
| 2008/0036743 A1 | 2/2008 | Westerman et al. |
| 2008/0036747 A1 | 2/2008 | Hope |
| 2008/0049135 A1 | 2/2008 | Okudaira |
| 2008/0055269 A1 | 3/2008 | Lemay et al. |
| 2008/0055276 A1 | 3/2008 | Chang |
| 2008/0059880 A1 | 3/2008 | Cato et al. |
| 2008/0064370 A1 | 3/2008 | Fukaya et al. |
| 2008/0082421 A1 | 4/2008 | Onyon et al. |
| 2008/0089587 A1 | 4/2008 | Kim et al. |
| 2008/0122796 A1 | 5/2008 | Jobs et al. |
| 2008/0153459 A1 * | 6/2008 | Kansal et al. ............. 455/412.1 |
| 2008/0182563 A1 | 7/2008 | Wugofski et al. |
| 2008/0189122 A1 | 8/2008 | Coletrane et al. |
| 2008/0189623 A1 | 8/2008 | Patil et al. |
| 2008/0207166 A1 | 8/2008 | Aerrabotu et al. |
| 2008/0222636 A1 | 9/2008 | Wang et al. |
| 2008/0229397 A1 | 9/2008 | Basner et al. |
| 2008/0256170 A1 | 10/2008 | Hayashi et al. |
| 2008/0281610 A1 | 11/2008 | Yoshida et al. |
| 2009/0006991 A1 | 1/2009 | Lindberg et al. |
| 2009/0029674 A1 | 1/2009 | Brezina et al. |
| 2009/0034804 A1 | 2/2009 | Cho et al. |
| 2009/0040018 A1 | 2/2009 | Lee et al. |
| 2009/0044578 A1 | 2/2009 | Boss et al. |
| 2009/0061823 A1 | 3/2009 | Chu |
| 2009/0064055 A1 | 3/2009 | Chaudhri et al. |
| 2009/0066489 A1 | 3/2009 | Golden |
| 2009/0102803 A1 | 4/2009 | Newman et al. |
| 2009/0104925 A1 | 4/2009 | Aula |
| 2009/0106415 A1 | 4/2009 | Brezina et al. |
| 2009/0119678 A1 | 5/2009 | Shih et al. |
| 2009/0128335 A1 | 5/2009 | Leung |
| 2009/0138562 A1 * | 5/2009 | Schmulen ............ G06Q 10/107 709/206 |
| 2009/0157732 A1 | 6/2009 | Hao et al. |
| 2009/0167717 A1 | 7/2009 | Wang et al. |
| 2009/0170553 A1 | 7/2009 | Wang et al. |
| 2009/0177981 A1 | 7/2009 | Christie et al. |
| 2009/0187676 A1 | 7/2009 | Griffin et al. |
| 2009/0209235 A1 | 8/2009 | Lawler et al. |
| 2009/0215479 A1 | 8/2009 | Karmarkar et al. |
| 2009/0217211 A1 | 8/2009 | Hildreth et al. |
| 2009/0222748 A1 * | 9/2009 | Lejeune ................ G06F 1/1616 715/764 |
| 2009/0234935 A1 | 9/2009 | Watson et al. |
| 2009/0245484 A1 | 10/2009 | Bates |

(56) References Cited

U.S. PATENT DOCUMENTS

| | | |
|---|---|---|
| 2009/0248844 A1 | 10/2009 | Sommer et al. |
| 2009/0259968 A1 | 10/2009 | Hsieh et al. |
| 2009/0264117 A1 | 10/2009 | Hsieh et al. |
| 2009/0264157 A1 | 10/2009 | Hsieh et al. |
| 2009/0265666 A1 | 10/2009 | Hsieh et al. |
| 2009/0288032 A1 | 11/2009 | Chang et al. |
| 2009/0296913 A1 | 12/2009 | Thomas et al. |
| 2009/0327263 A1* | 12/2009 | Maghoul ............................ 707/5 |
| 2010/0009727 A1 | 1/2010 | Presutti |
| 2010/0071423 A1 | 3/2010 | Dehaan et al. |
| 2010/0079380 A1 | 4/2010 | Nurmi |
| 2010/0082684 A1 | 4/2010 | Churchill et al. |
| 2010/0094939 A1 | 4/2010 | Cheng et al. |
| 2010/0105440 A1 | 4/2010 | Kruzeniski et al. |
| 2010/0123724 A1 | 5/2010 | Moore et al. |
| 2010/0127998 A1 | 5/2010 | Hyun |
| 2010/0145951 A1 | 6/2010 | Van Coeverden De Groot et al. |
| 2010/0156594 A1 | 6/2010 | Chaikin et al. |
| 2010/0159944 A1 | 6/2010 | Pascal et al. |
| 2010/0159995 A1 | 6/2010 | Stallings et al. |
| 2010/0162133 A1 | 6/2010 | Pascal et al. |
| 2010/0164740 A1 | 7/2010 | Lo et al. |
| 2010/0199359 A1 | 8/2010 | Miki |
| 2010/0207723 A1 | 8/2010 | Cao et al. |
| 2010/0214237 A1* | 8/2010 | Echeverri et al. ............ 345/173 |
| 2010/0223097 A1 | 9/2010 | Kramer et al. |
| 2010/0235733 A1 | 9/2010 | Drislane et al. |
| 2010/0241971 A1 | 9/2010 | Zuber |
| 2010/0251116 A1 | 9/2010 | Rimas-Ribikauskas et al. |
| 2010/0257490 A1 | 10/2010 | Lyon et al. |
| 2010/0309149 A1* | 12/2010 | Blumenberg et al. ........ 345/173 |
| 2010/0317335 A1 | 12/2010 | Borovsky et al. |
| 2010/0325155 A1 | 12/2010 | Skinner et al. |
| 2011/0035673 A1 | 2/2011 | Chou et al. |
| 2011/0035708 A1 | 2/2011 | Damale |
| 2011/0062143 A1 | 3/2011 | Satanek et al. |
| 2011/0081922 A1 | 4/2011 | Chandra et al. |
| 2011/0169909 A1 | 7/2011 | Gu |
| 2011/0179387 A1 | 7/2011 | Shaffer et al. |
| 2012/0030287 A1 | 2/2012 | Leonard |
| 2012/0303712 A1 | 11/2012 | Polis et al. |
| 2012/0319985 A1 | 12/2012 | Moore et al. |
| 2013/0205243 A1 | 8/2013 | Rivera et al. |
| 2014/0082557 A1 | 3/2014 | Warner |
| 2014/0258897 A1 | 9/2014 | Shiplacoff et al. |
| 2015/0193132 A1 | 7/2015 | Fagans |

OTHER PUBLICATIONS

"Global Framework—VD Specification". AT&T Armstrong project. Version 1.11. Last accessed Jun. 16, 2010, 117 pages.

"Phone Top—UE Flows and Screen Details". AT&T Armstrong Project. Version 1.18. Last accessed Jun. 16, 2010, 104 pages.

"Phone Top—VD Specification". AT&T Armstrong Project. Version 1.12. Last accessed Jun. 16, 2010, 52 pages.

"Phone / Dailer—UE Flows and Screen Details". AT&T Armstrong Project. Version 1.8. Last accessed Jun. 16, 2010, 57 pages.

"Dialer—VD Specification". AT&T Armstrong Project. Version 1.7. Last accessed Jun. 16, 2010, 19 pages.

"Contacts—UE Flows and Screen Details". AT&T Armstrong Project. Version 2.6. Last accessed Jun. 16, 2010, 142 pages.

"Contact—VD Specification". AT&T Armstrong Project. Version 2.2. Last accessed Jun. 16, 2010. 48 pages.

"Third-Party Pickers—UE Flows and Screen Details". AT&T Armstrong Project. Version 1.1. Last accessed Jun. 16, 2010, 23 pages.

"3rd Party Pickers". AT&T C@lumbus Project. Version 1.1. Last accessed Jun. 16, 2010, 7 pages.

"Social—UE Flows and Screen Details". AT&T C@lumbus Project. Version 1.5. Last accessed Jun. 16, 2010, 107 pages.

"Social—VD Specification". AT&T C@lumbus Project. Version 1.5. Last accessed Jun. 16, 2010, 39 pages.

"Media App—UE Flows and Screen Details". AT&T Armstrong Project. Version 1.6. Last accessed Jun. 16, 2010, 118 pages.

"Media—VD Specification". AT&T Armstrong Project. Version 1.3. Last accessed Jun. 16, 2010, 29 pages.

"Mobile Share—Reduced Scope; UE Flows and Screen Details". AT&T Armstrong Project. Version 1.2 RS. Last accessed Jun. 16, 2010, 59 pages.

"Mobile Share (Reduced Scope)". AT&T Armstrong Project. Version 1.2RS. Last accessed Jun. 16, 2010, 15 pages.

"Camera App—UE Flows and Screen Details". AT&T Armstrong Project. Version 1.8. Last accessed Jun. 16, 2010, 77 pages.

"Camera—VD Specification". AT&T Project. Version 1.8. Last accessed Jun. 16, 2010, 22 pages.

"Alarm Clock—UE Flows and Screen Details". AT&T Armstrong Project. Version 1.4. Last accessed Jun. 16, 2010, 35 pages.

"Alarm Clock—VD Specification". AT&T Armstrong Project. Version 1.4. Last accessed Jun. 16, 2010, 18 pages.

"Settings—UE Flows and Screen Details". AT&T Armstrong Project. Version 1.18. Last accessed Jun. 16, 2010, 180 pages.

"Settings—VD Specification". AT&T Armstrong Project. Version 1.8. Last accessed Jun. 16, 2010, 40 pages.

"Conversations—UE Flows and Screen Details". AT&T Armstrong Project. Version 1.3. Last accessed Jun. 16, 2010, 148 pages.

"Conversations". AT&T Armstrong Project. Version 1.5. Last accessed Jun. 16, 2010, 54 pages.

"Firmware Over the Air Updates—UE Flows and Screen Details". AT&T Armstrong Project. Version 1.9. Last accessed Jun. 16, 2010, 39 pages.

Paul McDougall. Browser. AT&T Armstrong Project. Version 1.3. Last accessed Jun. 16, 2010, 6 pages.

Paul McDougall. Maps. AT&T Armstrong Project. Version 1.3. Last accessed Jun. 16, 2010, 8 pages.

"Reference Guide". AT&T Armstrong Project. Version 1.0, Last accessed Jun. 16, 2010, 4 pages.

D. Austin Henderson, Jr. Rooms: the use of multiple virtual workspaces to reduce space contention in a window-based graphical user interface. ACM Transactions on Graphics. http://portal.acm.org/citation.cfm?id=24056&coll=portal&dl=ACM&CFID=23778768&CFTOKEN=77139655.

http://www.siliconvalleywatcher.com/mtJarchives/2010/04/panama_kill_voi.php.

http://www.google.com/support/forum/p/voice/thread?tid=64d1c9d5fb45cccf&hl=en.

Bob Tedeschi, Group Texting Grows Up, With Features That Appeal to Adults. http://www.nytimes.com/2010/10/21/technology/personaltech/21smarthtml. Last accessed Nov. 1, 2010, 3 pages.

A Teenager's Dream: An iPhone App for Free Texting—Bits Blog—NYTimes.com. http://bits.blogs.nytimes.com/2009/08/25/a-teens-dream-an-iphone-app-for-tree-texting. Last accessed Oct. 13, 2009, 19 pages.

Build and grow with Facebook Connect. http://developers.facebook.com/connect.php? tab=website. Last accessed Nov. 2, 2009, 2 pages.

Build and grow with Facebook Connect. http://developers.facebook.com/connect.php?tab=iphone. Last acceseed Nov. 2, 2009, 1 pages.

http://www.sprint.com/cdma/assets/pdfs/phone_guides/palm/palm_pre_p100_ug.pdf at pp. 44, 57-58. Last accessed Nov. 6, 2009, 3 pages.

MTN—Meeting the needs of the South African market for a new mobile messaging solution—Mobile IM. http://www.moviuscorp.com/files/case_study_mtn.pdf. Last accessed Nov. 2, 2009, 5 pages.

http://www.bizzia.com/buzznetworker/social-web-aggregation. Last accessed Nov. 6, 2009, 4 pages.

Alexander the Late. http://alexanderthelate.wordpress.com/2008/02/11/social-media-aggregation-lifestreaming-all-of-your-web-activity-in-one-simple-and-potentially-inconvenient-place/. Last accessed Nov. 3, 2009, 3 pages.

Schroeder, 20 Ways to Aggregate Your Social Networking Profiles, http://mashable.com/2007/07/17/social-network-aggregators/, Jul. 17, 2007, 20 pages.

(56) References Cited

OTHER PUBLICATIONS

Hirsch, iPhone 2.0 Apps: The Social Networking App Comparison, http://mashable.com/2008/07/17/iphone-social-networking-app-comparison/, Jul. 17, 2008, 9 pages.
Lifestream: Bebo's new social media aggregation tool | Media | guardian.co.uk, http://www.guardian.co.uk/media/pda/2009/feb/23/socialnetworking-bebo, Last Accessed Nov. 6, 2009, 3 pages.
Wikipedia, Social network aggregation—Widipedia, the free encyclopedia, http://en.wikipedia.org/wiki/Social_Network_Aggregation, Last Accessed Nov. 6, 2009, 3 pages.
Jaiku | Your Conversation, www.jaiku.com, Last accessed Nov. 6, 2009, 3 pages.
StumbleUpon.com: Personalized Recommendations to Help You Discover the Best of the . . . , www.stumbleupon.com, Last accessed Nov. 6, 2009, 2 pages.
The Walt Disney Internet Group, www.dig.com, Last accessed Nov. 6, 2009, 1 page.
Delicioussocial bookmarking, www.del.icio.us, Last accessed Nov. 6, 2009, 6 pages.
Google Wave—Wikipedia, the free encyclopedia, http://en.wikipedia.org/wiki/Google_wave, Last accessed Dec. 18, 2009, 5 pages.
Motorola Backflip (TM )—Wireless from AT&T, http://www.wireless.att.com/cell-phone-service/cell-phone-sales/promotion/motobackflip.jsp, Last Accessed Mar. 29, 2010, 2 pages.
Motoblur—Motorola USA, http://www.motorola.com/Consumers/US-EN/Consumer-Product-and-Services/MOTOBL . . . , Last accessed Mar. 29, 2010, 3 pages.
OA dated Nov. 14, 2011 for U.S. Appl. No. 12/643,726 , 59 pages.
Spagnuolo-Tweetdeck, http://edgehopper.com/how-to-use-tweetdeck-the-ultimate-twitter-client/,Feb. 12, 2009, 11 pages.
OA dated Apr. 6, 2012 for U.S. Appl. No. 12/643,726, 43 pages.
OA dated Jun. 12, 2012 for U.S. Appl. No. 12/903,618, 41 pages.
"Brads Live: AddressBooker & exporting my Facebook Phonebook" http://brad.livejournalcom/2398409.html as archived on archive.org on Dec. 5, 2008.
OA dated Sep. 7, 2012 for U.S. Appl. No. 12/902,979, 63 pages.
Office Action for U.S. Appl. No. 12/903,679 dated Jan. 31, 2014, 17 pages.
Sprint, "Palm Pre Phone User Guide," 2009, 388 Pages, Palm, Inc., United States.
Office Action dated Jan. 28, 2015 for U.S. Appl. No. 12/903,382, 57 Pages.
Office Action dated Mar. 10, 2015 for U.S. Appl. No. 12/903,618, 24 Pages.
OA dated Jun. 13, 2013 for U.S. Appl. No. 12/903,382, 53 pages.
OA dated May 14, 2013 for U.S. Appl. No. 12/903,414, 62 pages.
Notice of Allowance dated Jun. 27, 2014 for U.S. Appl. No. 12/903,679, 29 Pages.
Non-Final OA dated Jun. 18, 2014 for U.S. Appl. No. 12/643,726.
Office Action dated Sep. 14, 2015 for U.S. Appl. No. 12/643,726, 73 Pages.
Office Action dated Jul. 29, 2015 for U.S. Appl. No. 12/903,618, 24 Pages.
Gross, et al., "Information Revelation and Privacy in Online Social Networks," Workshop on Privacy in the Electronic Society, Nov. 2005, pp. 71-80, ACM, Alexandria, Virginia, 10 Pages.
Office Action dated Aug. 23, 2013 for U.S. Appl. No. 12/643,726, 61 pages.
Office Action dated Nov. 1, 2013 for U.S. Appl. No. 12/903,382, 30 pages.
Office Action dated Sep. 26, 2013 for U.S. Appl. No. 12/903,618, 36 pages.
Office Action dated Oct. 11, 2013 for U.S. Appl. No. 12/903,679, 22 pages.
Office Action dated Aug. 26, 2014 for U.S. Appl. No. 12/903,618, 25 pages.
Office Action dated Sep. 23, 2014 for U.S. Appl. No. 12/903,382, 32 pages.
Office Action dated Sep. 30, 2014 for U.S. Appl. No. 12/643,726, 63 pages.
OA dated Feb. 11, 2013 for U.S. Appl. No. 12/902,979, 53 pages.
OA dated Dec. 20, 2012 for U.S. Appl. No. 12/903,679, 40 pages.
OA dated Mar. 13, 2013 for U.S. Appl. No. 12/643,726, 55 pages.
Office Action dated Apr. 14, 2016 for U.S. Appl. No. 14/543,872, 92 pages.
Notice of Allowance dated Jun. 28, 2016 for U.S. Appl. No. 12/903,618, 21 Pages.

* cited by examiner

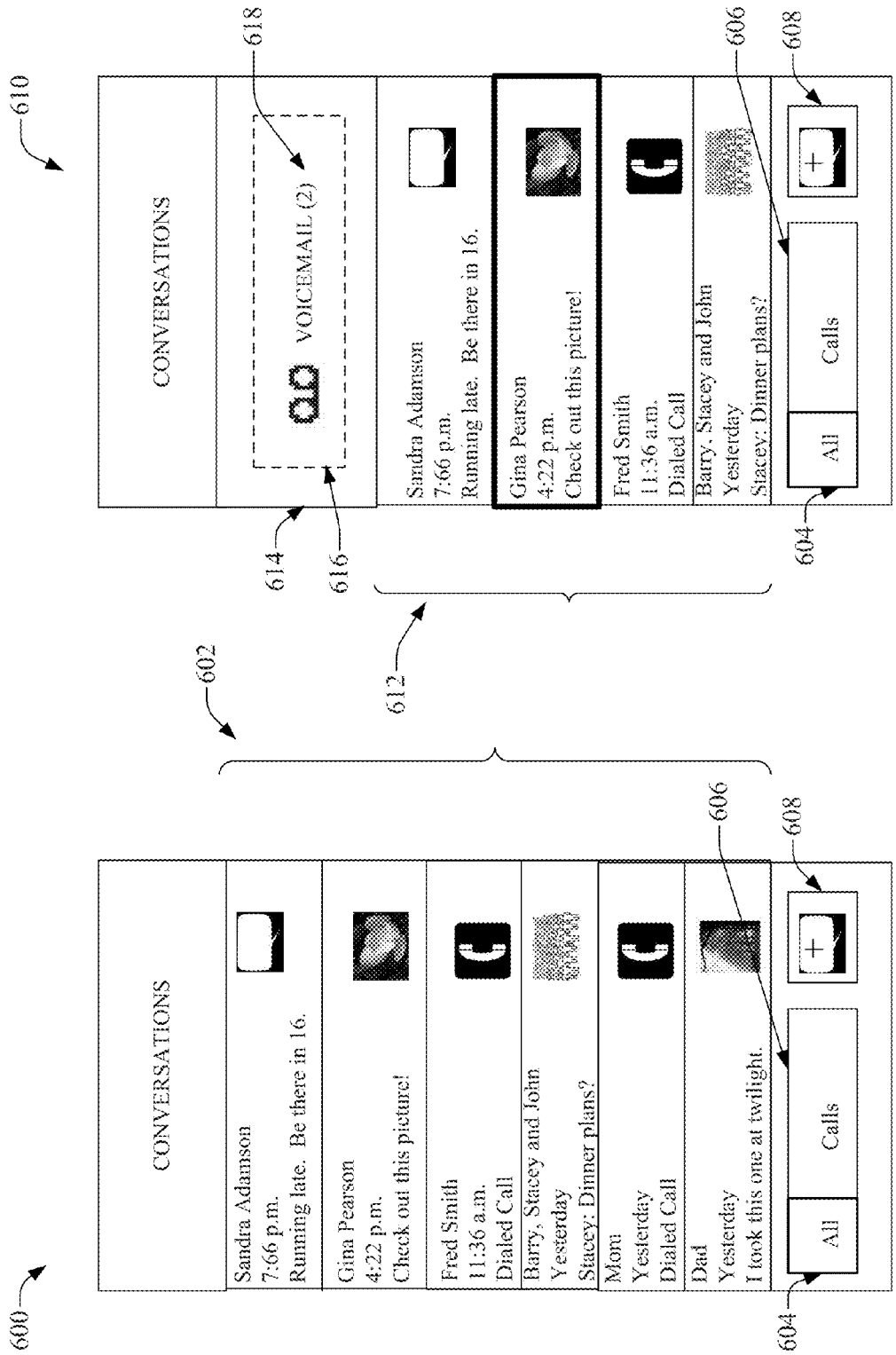

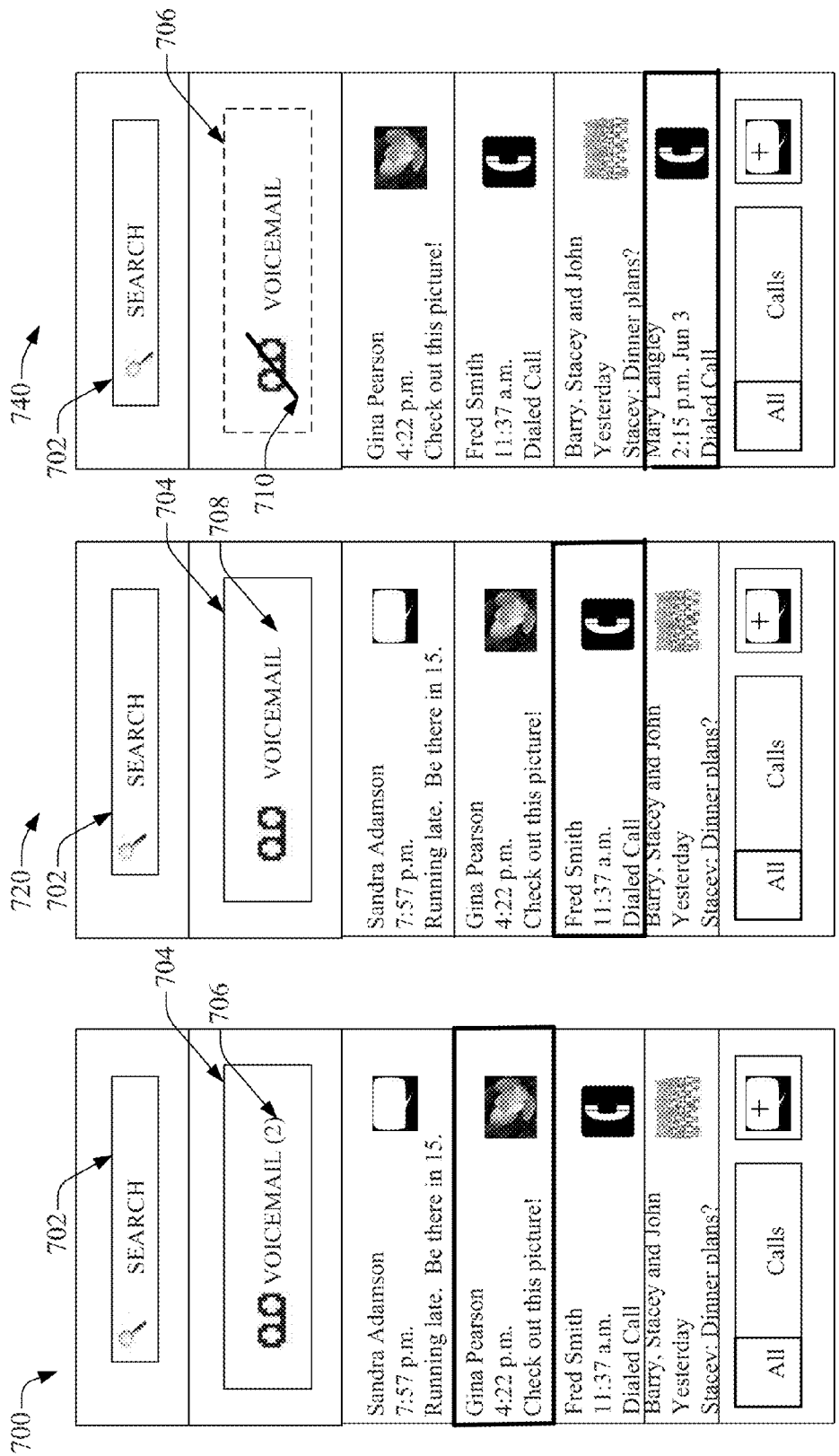

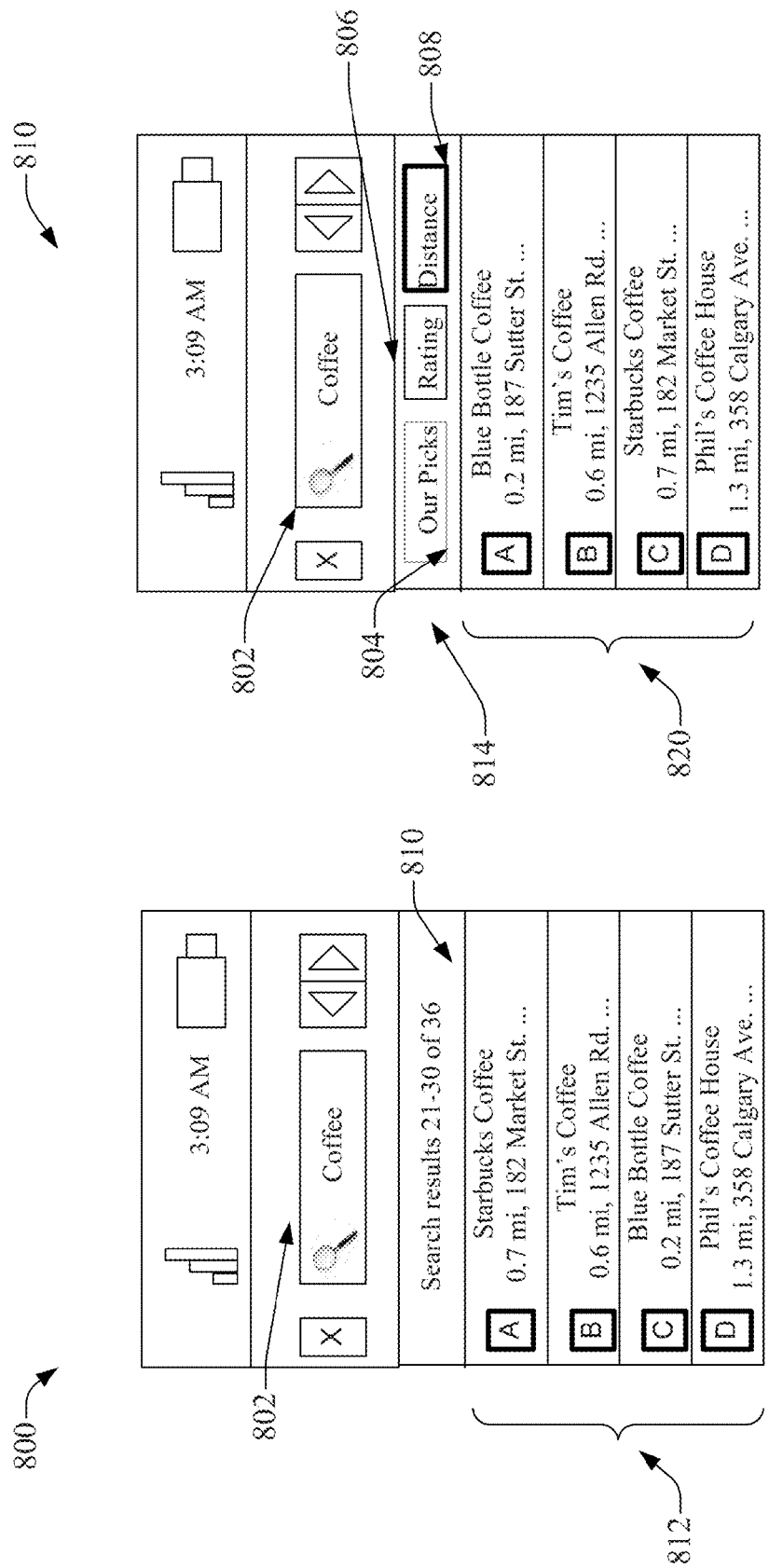

SYSTEMS, APPARATUS, METHODS AND COMPUTER-READABLE STORAGE MEDIA FACILITATING INFORMATION RETRIEVAL FOR A COMMUNICATION DEVICE

CROSS-REFERENCES TO RELATED APPLICATIONS

This application claims priority to and the benefit of U.S. Provisional Application No. 61/251,717, filed Oct. 14, 2009, and titled "SYSTEMS, METHODS AND APPARATUS FOR NEXT-GENERATION MOBILE MESSAGING," the entire contents of which is incorporated herein by reference.

BACKGROUND

With advancements in technology, the amount and type of information that users can access over wireless networks is growing rapidly. Similarly, mobile devices are becoming ubiquitous due to convenience of use resultant from their lightweight nature. Users are also pushing the envelope on the applications and information that are required to be provided via the devices to maintain contact with friends and colleagues. Because of the foregoing, users of communication devices are often confronted with a massive amount of information. Such a sizeable amount of information can make retrieval of desired information somewhat complex, time-consuming and inefficient. Additionally, understanding the relationships between different types of information stored on the communication device can be quite difficult and lead to a less than enjoyable user experience. As such, systems, apparatus, methods and computer-readable storage media for facilitating information retrieval for communication devices are desirable.

SUMMARY

The following presents a simplified summary in order to provide a basic understanding of various aspects described herein. The summary is not an extensive overview, and is not intended to identify key or critical elements or to delineate the scopes thereof. The sole purpose of the summary is to present selected concepts in a simplified form as a prelude to the more detailed description that is presented below.

The aspects described herein are systems, apparatus, methods and computer-readable storage media for facilitating information retrieval for communication devices.

In one aspect, a computer-implemented method is provided. The computer-implemented method can include: detecting a selection of an item, the item being displayed via user interface (UI); searching for information associated with the item for which selection is detected, wherein the searching is performed automatically based, at least, upon the detecting the selection of the item; and displaying search results, via the UI, wherein the displaying the search results is performed automatically during the selection of the item.

In another aspect, a computer-implemented method is provided. The computer-implemented method can include: displaying, via a user interface (UI), indicia of messaging information on a first portion of a display region of a communication device; and displaying, via the UI, search results associated with the messaging information, wherein the displaying the search results is based, at least, on detecting a selection of the messaging information, and wherein the displaying the search results comprises displaying the search results during a time period for which the messaging information is selected, and not displaying the search results during a time period for which the messaging information is not selected.

In another aspect, an apparatus is provided. The apparatus can include a processor; and an information retrieval component configured to: display an item via a user interface (UI); detect a selection of the item; search for information associated with the item for which selection is detected, wherein searching is performed automatically based, at least, upon detecting the selection of the item; and display search results, wherein displaying is performed for a time period during which the item is selected. In some embodiments, the apparatus can also include a computer-readable storage medium storing computer-executable instructions that, if executed, cause the functions of the information retrieval component to be performed.

BRIEF DESCRIPTION OF THE DRAWINGS

Non-limiting and non-exhaustive embodiments of various aspects detailed herein are described with reference to the following figures, wherein like reference numerals refer to like parts.

FIGS. 6A, 6B, 7A, 7B, 7C, 8A and 8B illustrate display regions of UIs for facilitating information retrieval in accordance with aspects described herein.

DETAILED DESCRIPTION

Figure 1:
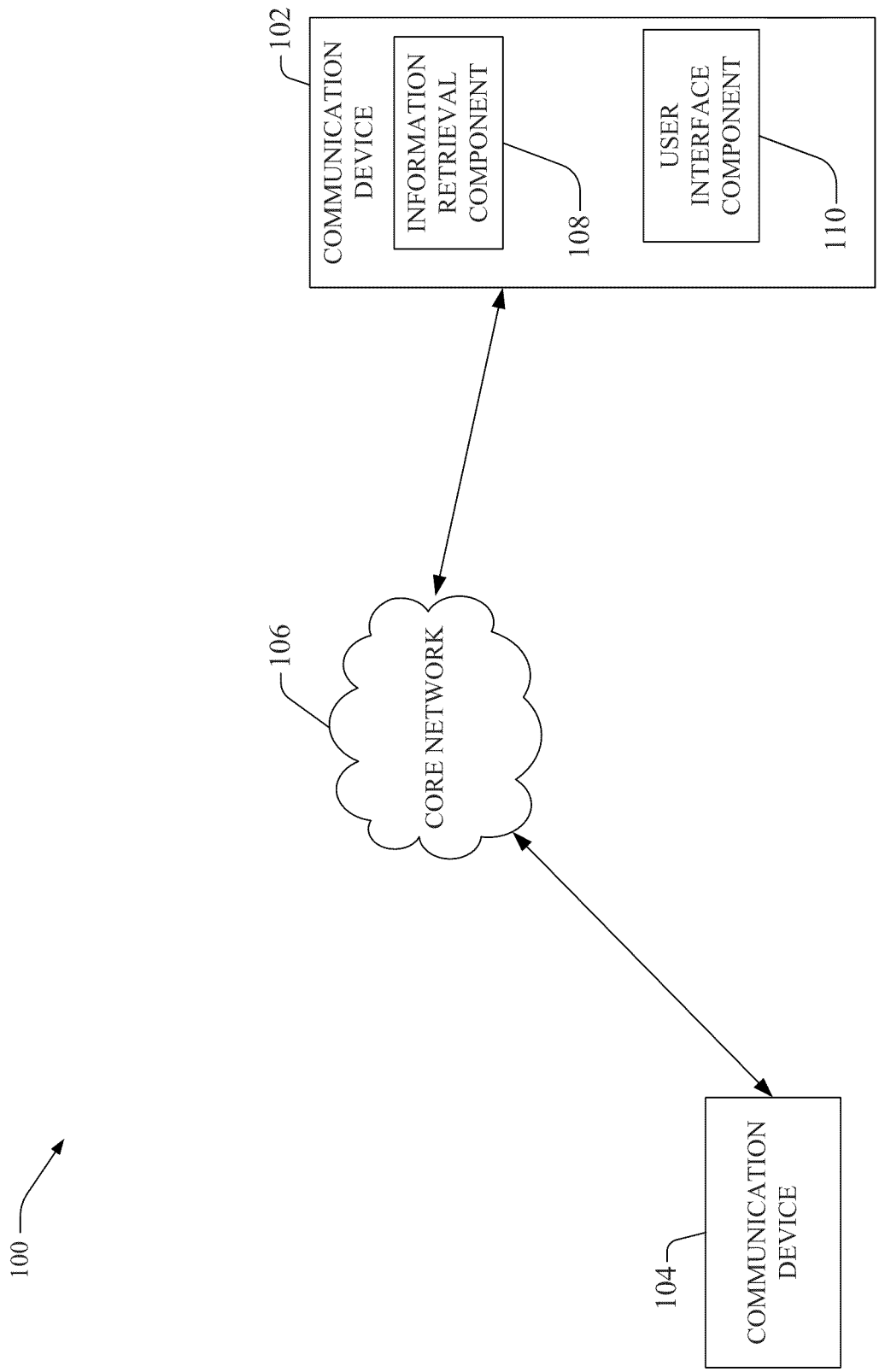
FIG. 1 illustrates a block diagram of an exemplary system that facilitates information retrieval for a communication device in accordance with various aspects described herein.

Certain illustrative embodiments are described herein in the following description and the annexed drawings. These embodiments are merely exemplary, non-limiting and non-exhaustive. As such, all modifications, alterations, and variations within the spirit of the embodiments is envisaged and intended to be covered herein.

Further, in the following description, for purposes of mere explanation, numerous, specific details are set forth in order to facilitate a more thorough understanding of the embodiments described herein, including the claimed subject matter. However, as is known to those of ordinary skill in the art, the embodiments can be practiced, in many instances, without inclusion of the specific details.

As used in this application, the terms "component," "module," "system," "interface," and the like, are generally intended to refer to hardware and/or software or software in execution. For example, a component can be, but is not limited to being, a process running on a processor, a processor, an object, an executable, a thread of execution, a program and/or a computer. By way of illustration, both an application running on a controller and the controller can be a component. One or more components can reside within a process and/or thread of execution and a component can be localized on one computer and/or distributed between two or more computers. As another example, an interface can include input/output (I/O) components as well as associated processor, application and/or application programming interface (API) components, and can be as simple as a command line or as complex as an Integrated Development Environment (IDE).

Furthermore, the embodiments can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. Computer-readable storage media can include, but are not limited to, magnetic storage devices (e.g., hard disk, floppy disk, magnetic strip), optical disks (e.g., compact disk (CD), digital versatile disk (DVD)), smart cards, and/or flash memory devices (e.g., card, stick, key drive). Additionally it should be appreciated that a carrier wave can carry computer-readable electronic data (e.g., the data transmitted and received via email and/or to access the Internet or a network such as a local area network (LAN)). As known to those of ordinary skill in the art, modifications can be made to the above embodiments without departing from the spirit of the disclosure.

It will be appreciated by one of skill in the art that a communication network for systems described herein can include any suitable mobile- and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further examples of a communication network can include any suitable data packet-switched or combination data packet/circuit-switched communication network, wired or wireless internet protocol (IP) network such as a voice over internet protocol (VoIP) network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device for systems disclosed herein can include a mobile device, mobile phone, a PSTN phone, a cellular communication device, a cellular phone, a satellite communication device, a satellite phone, a VoIP phone, a wireless fidelity (WiFi) phone, a dual-mode cellular/WiFi phone, a combination cellular/VoIP/WiFi/Worldwide Interoperability for Microwave Access (WiMAX) phone or any suitable combination thereof. Specific examples of a mobile device can include, but is not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones UMTS VoIP phones, or like devices or combinations thereof. To provide support for a mobile device, a gateway routing component can include any suitable component that can perform centralized routing within a mobile, satellite, or similar network (but optionally need not include components that route strictly within a PSTN network), routing between communication networks, between networks of varying architecture (e.g., between PSTN, GSM, Universal Mobile Telecommunications System (UMTS), Enterprise VoIP, the Internet, or combinations thereof), and the like. Specific examples of a gateway routing component can include, but are not limited to, a gateway mobile switching center (GMSC), a gateway general packet radio service (GPRS) support node (GGSN), a session border control (SBC) device, or like devices. Additionally, a data storage component of such a system can include any suitable device, process and/or combination device and process that can store digital and/or switched information (e.g., server, database, data store, or the like).

FIG. 1 illustrates a block diagram of an exemplary system that facilitates information retrieval at a communication device in accordance with various aspects and embodiments described herein. In an aspect, the system 100 can include communication devices 102, 104 and a core network 106. The communication devices 102, 104 can be communicatively coupled to the core network 106. In various embodiments, one or more of communication devices 102, 104 can include the software, hardware and/or have the functionality and/or structure (or portions thereof) of communication device 200 described herein (and vice versa).

In various embodiments, the core network 106 can include one or more of software, hardware and/or combination software and hardware configured to provide connectivity to and between the communication devices 102, 104. The system 100 can include one or more macro, Femto and/or pico access points (APs) (not shown), base stations (BS) (not shown) or landline networks (e.g., optical landline networks, electrical landline networks) (not shown) communicatively coupled between one or more of the communication devices 102, 104 and the core network 106 to provide connectivity between the communication devices 102, 104 and the core network 106. In various embodiments, the communication devices 102, 104 can communicate via any number of various types of wireless technologies including, but not limited to, cellular, WiFi, WiMax, wireless local area networks (WLAN), etc. In corresponding embodiments, the core network 106 can provide cellular, WiFi, WiMAX, WLAN and other technologies for facilitating such communication. The core network 106 can also include the Internet (or another communication network (e.g., IP-based network), a digital subscriber line (DSL)-type or broadband network facilitated by Ethernet or other technology. The core network 106 can also include, in various embodiments, servers including, email, multimedia, audio, video, news, financial or stock information servers.

The core network 106 can also include short message service (SMS) networks and multimedia message service (MMS) networks. The core network 106 can also include but is not limited to, routers, nodes, switches, interfaces, and/or controllers that can facilitate communication of data to or from the communication devices 102, 104. The core network 106 can transmit and receive voice, text, pictorial, video, audio and/or data traffic to and from the communication devices 102, 104. While only communication devices 102 and 104 are shown, in various embodiments, the core network 106 can include or can be communicatively coupled to other communication devices inside or outside of the network. In various embodiments, the network can also include hardware, software and/or a combination of hardware and software for allocating resources to the communication devices 102, 104, converting or enforcing protocols, establishing and/or providing levels of Quality of Service (QoS), applications or services in the network, translating signals, and/or performing other desired functions to facilitate system interoperability and communication to or from the communication devices 102, 104.

In various embodiments, the core network 106 can include or can be communicatively coupled to one or more of multimedia servers (not shown), email servers (not shown), databases (not shown), Internet (not shown) for communicating one or more of text or email messages, data, pictures, multimedia, voice or video.

The core network 106 can also include databases and/or memory storing information and/or computer-readable storage media storing computer-executable instructions enabling various operations by the communication devices 102, 104. In some embodiments, the core network 106 can include databases and/or memory storing computer-executable instructions and/or settings for providing information retrieval to, from or within the communication devices 102, 104. In some embodiments, a database can store settings, and/or memory can store computer-executable instructions, enabling the communication device 104 to operate according to information retrieval protocols and methods as described in greater detail herein.

In various embodiments, the communication devices 102, 104 can be mobile, wireless, wireline and/or optical devices. The communication devices 102, 104 can include, but are not limited to, a mobile or cellular telephone including, but not limited to, a smartphone, BLUETOOTH® device, a 3GPP UMTS phone, a personal digital assistant (PDA), computer, IP television (IPTV), wireline phone with mobile messaging functionality, gaming console, a set top box (STB), a multi-media recorder, a multi-media player, a video recorder, a video player, an audio recorder, an audio player, laptop, a printer, a copier and/or a scanner.

In various embodiments, the communication devices 102, 104 can include hardware, software or a combination of hardware and software facilitating operation according to one or more communication protocols described above with reference to the core network 106, or the functionality facilitated by the hardware, software or combination hardware and software described above with reference to the core network 106. The communication protocols and/or functionality can include, but is not limited to, MMS, SMS, WLAN, WiFi, WiMAX, BLUETOOTH® protocol, text messaging, electronic mail messaging, facsimile, multimedia and/or any number of other protocols or functionalities as described above with reference to the communications protocols or functionalities facilitated by core network 106. In various embodiments, the communication devices 102, 104 can transmit and/or receive voice, text, pictorial, video, audio and/or data traffic to and from the communication devices 102, 104.

In some embodiments, the communication devices 102, 104 can include hardware, software and/or a combination of hardware and software to facilitate information retrieval at, from or within the communication devices 102, 104 as described herein. For example, in various embodiments, as shown at communication device 102, the communication devices 102, 104 can include an information retrieval component 108 and a UI component 110 for information retrieval at the communication device 102. In various embodiments, the UI component 110 can facilitate receiving or outputting information for providing or enabling the information retrieval protocols, providing or enabling communication to or from the communication device 102, accessing information stored within, or storing information within, the communication device 102, or any controlling the communication device 102, or receiving information output from the communication device 102, via the UI component 110.

In various embodiments, the communication device 102 can provide one or more types of information retrieval at the communication device 102. While information retrieval methods and communication devices facilitating such are described below with reference communication device 200, in various embodiments, the communication device 200 can be or include one or more of the functions or structure (or portions thereof) of communication device 102, 104 (and vice versa).

Figure 2:
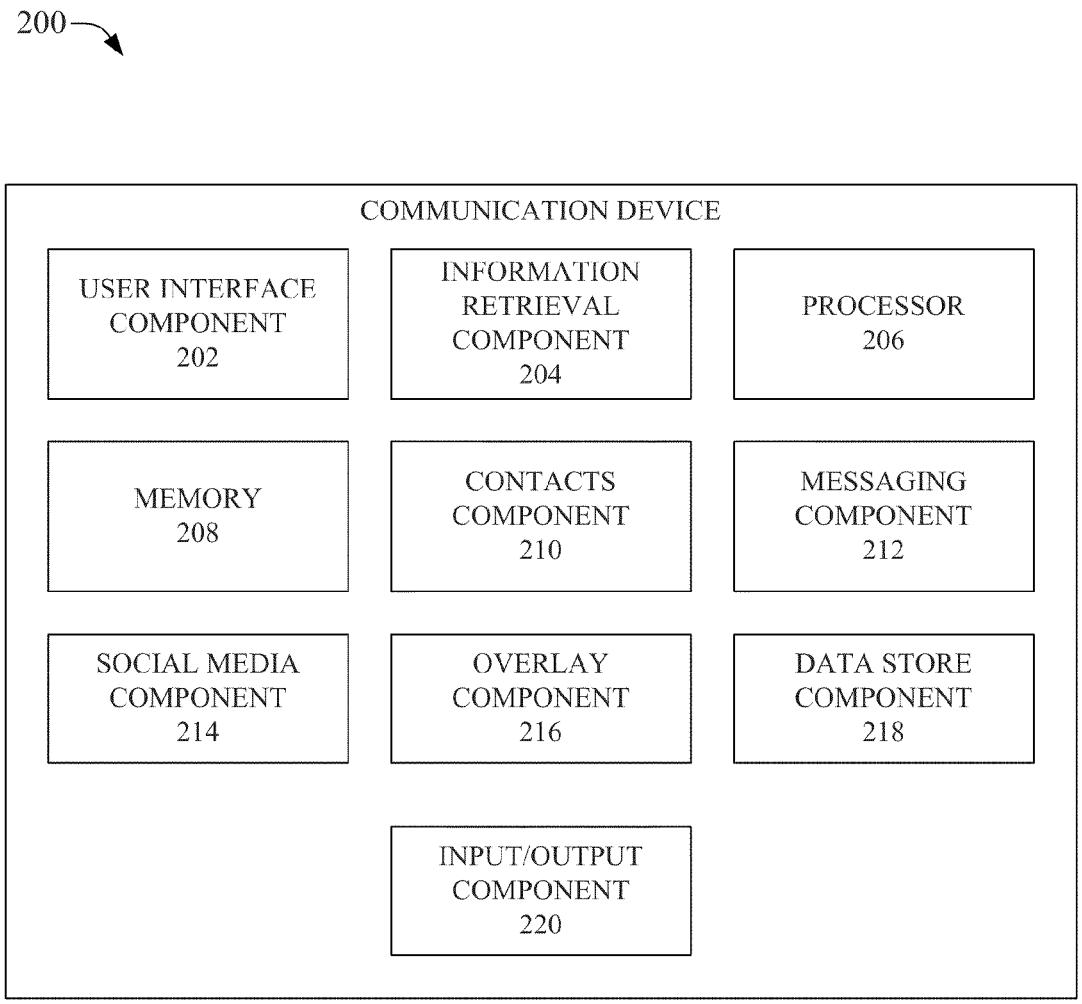
FIG. 2 illustrates a block diagram of an exemplary communication device for which information retrieval can be facilitated in accordance with various aspects described herein.

Turning now to FIG. 2, FIG. 2 illustrates a block diagram of a communication device that facilitates security in accordance with various aspects and embodiments described herein. The communication device 200 can include a UI component 202, an information retrieval component 204, a processor 206, a memory 208 and an input/output (I/O) component 220. In various embodiments, the communication device 200 can also include a contacts component 210, a messaging component 212, a social media component 214, an overlay component 216 and/or a data store component 218. One or more of the components can be communicatively coupled to one another to perform the functions of the communication device 200 described herein.

Referring first to the I/O component 220, the I/O component 220 can include hardware, software and/or a combination of hardware and software facilitating receipt and output of information to and from the communication device 200. The receipt and output of such information can be utilized to provide information retrieval at the communication device 200.

Turning now to the UI component 202, the UI component 202 can include hardware, software and/or a combination of hardware and software facilitating display of information from the communication device. Because information and UI displays for information retrieval can be provided via the UI component, the UI component 202 can work in conjunction with the I/O component 220 and the information retrieval component 204 (which is described in greater detail below).

The UI component 202 can control the UI for the communication device 200. The UI can be any number of different types of UIs including, but not limited to, a graphical user interface (GUI), a touch-sensitive interface (e.g., a touch display region), an interface having capability for receiving audio input (and outputting audio information) and the like. In some embodiments described herein, the UI can include a touch display region configured to receive inputs at the touch display region and graphically output information for information retrieval from the communication device 200.

Turning now to the information retrieval component 204, the information retrieval component 204 can include software, hardware and/or a combination of hardware and software for providing information retrieval for the communication device 200.

The information retrieval protocols can utilize a number of approaches for retrieval of information for an item displayed via (or otherwise output from) the UI of the communication device 200. Retrieval protocols can include, for example, searching a portion of the data store component 218 (or a database, generally) in which information related to the item is stored. The information related to the item can be stored in the database prior to the selection of the item and the subsequent retrieval of such search results by the information retrieval component 204. Upon querying the portion of the database associated with the item, the information retrieval component 204 can obtain the search results for the item and display the search results on the UI.

In various embodiments, the information associated with the item can be stored in the database at the time of receipt of the item at the communication device 200, transmission from the communication device 200 and/or generation by the communication device 200. For example, in embodiments wherein the item is a conversation (or messaging content such as a message or call associated with the conversation), the I/O component 202 can receive the item and also receive details associated with the item. The item and details can be stored at a location designated by a conversation identification (ID). In various embodiments, the item and details about the item can be associated by other approaches other than associating to a conversation ID. Any number of ways of identifying an item and information associated with the item can be employed.

Further, in some embodiments, additional information can be generated and also stored upon receipt of the item. In some embodiments, for example, a timestamp, can be generated a timestamp for time of receipt of the item, and stored in association with the item.

The information retrieval component 204 can search the portion of the database associated with the conversation ID to retrieve and display information about the item.

The searching can be performed automatically by the information retrieval component 204 upon the communication device 200 detecting that the item is selected at the UI of the communication device 200.

The information retrieval component 204 can also automatically display on the UI, the search results. The search results can be displayed while the item is selected, and not displayed while the item is not selected. The search results can be the information associated with the item. As such, upon selecting a message, the information retrieval component 204 can retrieve information including, but not limited to, the time of receipt of the message, the sender of the message, etc. Such search results can be displayed via the UI.

Referring back to the information retrieval component 204, the information retrieval protocol implemented by the information retrieval component 204 can depend on the mode and/or display at the communication device 200 and/or the function currently being provided by the communication device 200. By way of example, but not limitation, while the communication device 200 is displaying messaging information (e.g., messages and/or calls to and from a single entity), the information retrieval component 204 can retrieve information about the messaging information (and/or the conversation for the messaging information) if the messaging information is selected. As used herein, an entity can be an individual person, legal entity or the like.

With regard to information retrieval while the communication device 200 is in the conversation mode and/or displaying one or more conversations, and while a conversation is selected, the information retrieval component 204 can retrieve information about whether voicemails are associated with the conversation, a number of voicemails associated with the conversation and/or messaging details including, but not limited to, the sender or recipient of the messaging information, the time and/or date of receipt or transmission of the messaging information, a portion of text transmitted or received with messaging content, contacts or social media information associated with the sender or recipient of the message or the like.

In various embodiments, the information retrieval component 204 can automatically cause the display of the search results. The results can be retrieved automatically and/or displayed automatically while the conversation is selected. The information retrieval component 204 can, in some embodiments, temporarily display the search results during the time that the conversation is selected in some embodiments. In some embodiments, upon selecting the conversation, the information retrieval component 204 can display the search results until the conversation is de-selected.

In some embodiments, the information retrieval component 204 can cause a drop down box to appear as part of the UI when items of the UI are selected. The drop down box can appear for as long as the item is selected or until the item is de-selected. In some embodiments, the drop down box can appear for a predefined amount of time irrespective of whether the item continues to be selected. In some embodiments, the drop down box can appear for a variable amount of time depending upon the amount of information searched and displayed about the item selected with the drop down box being and search results being displayed for a longer period of time if the search results are more extensive than the time that the drop down box is provided if the search results are not as extensive. As such, in these embodiments, as different items on the UI are selected, the drop down box can appear and display information retrieved about the item selected.

In other embodiments, the drop down box need not be so designed and can be a box or other graphical indicia on the UI. Further, in some embodiments, the information retrieval component 204 can cause the communication device 200 to output audio and/or video or text detailing the search results retrieved by the information retrieval component 204.

Selecting the conversation (or any other item displayed on the UI) can include scrolling (e.g., vertically, horizontally) to the item, locating an icon or cursor position corresponding to a location of the item, entering an input to the UI corresponding to the item or providing input to the UI corresponding to a location of the item.

FIGS. 6A and 6B provide an illustration of the retrieval and display of information when the item selected is a conversation. Turning to FIGS. 6A and 6B, display regions of 600, 610 are shown illustrating numerous conversations 602, 612 between the owner of the communication device 200 and various third-parties. For example, Sandra Adamson is a third-party associated with a first conversation and Gina Pearson is a third-party associated with a second conversation. As shown, the conversations can include MMS messages, SMS messages, telephone calls and the like. Further, the conversations can be represented by displaying the most recent event in the conversation although other events in the conversation can be displayed upon activated an expanded view of the conversation.

Display region 600 has no selected conversations, and therefore the information retrieval component 204 retrieves and/or displays no additional information about the conversations.

However, display region 610 depicts selection of the conversation associated with Gina Pearson. While selection of a conversation is shown as an emphasized conversation, the conversation associated with the selected conversation need not be emphasized in other embodiments and is simply for purposes of illustration. Upon selection of the conversation, the information retrieval component 204 can retrieve information about the conversation. For example, as shown, the information retrieval component 204 retrieves information indicating that two voicemails are associated with the selected conversation. During the time period that the conversation is selected, the information retrieval component 204 can automatically retrieve and display information about the selected conversation.

As shown, the search results retrieved by the information retrieval component 204 can be displayed in a first portion of the UI while the item to be searched can be displayed in a second portion of the UI. In some embodiments, the first portion and the second portion are non-overlapping for ease of viewing the item and the search results. In various embodiments, however, the first portion can overlap partially or completely with the item searched and the search results can be displayed in such overlapping first portion. The overlay component 216 of FIG. 2 can be employed to overlay the search results partly or completely over the item searched by the information retrieval component.

Figures 5A, 5B:
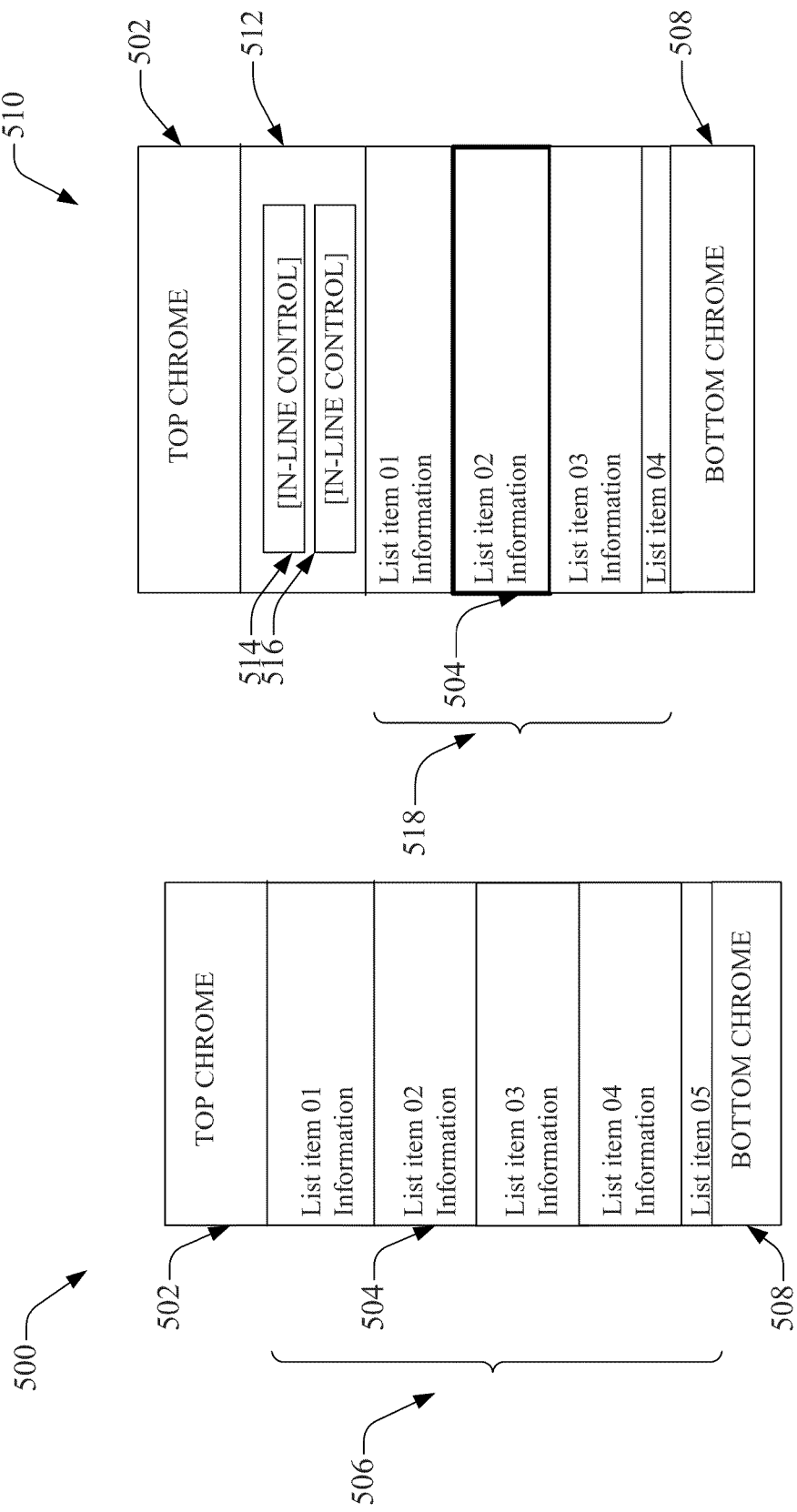
FIGS. 5A and 5B illustrate display regions of a UI for facilitating information retrieval in accordance with aspects described herein.

Referring to FIG. 5B, the UI can include an in-line control portion such as those shown at 514, 516. The in-line control portion can be configured to be controlled by the information retrieval component 204 to display the search results. The in-line control portions 514, 516 can be configured to provide a drop down of information in embodiment wherein the portion of the UI that displays search results is a drop down box.

FIG. 5A shows the list item region at position 506 when the in-line control does not receive a command to display search results (e.g., when no information is retrieved by the information retrieval component 204 and/or when no list item is selected).

FIG. 5B shows the list item region at position 518 when the in-line control receives a command to display search results (e.g., when the information retrieval component 204 searches list item 02 (shown at 504). As shown when comparing the positions of 506 and 518, when the information retrieval component 204 displays search results, the items can be relocated on the UI to provide the search results at the in-line control positions 514, 516.

While the in-line control positions 514, 516 are shown at region 512 of FIG. 5B, they need not be so located and can be provided at any location of the UI, including locations overlapping with the location designated by 504.

The top chrome 502 and bottom chrome 508 can also be separately controlled to display information or receive inputs at the UI. For example, with reference to 604, 606 and 608 of FIGS. 6A and 6B, the bottom chrome can be separately controlled to receive inputs for controlling the information displayed in the display regions 600, 610.

FIGS. 7A, 7B and illustrate display regions for three different conversation lists in which two voicemails are associated with the conversation selected in display region 700, a single voicemail is associated with the conversation selected in display region 720 and no voicemails are associated with the conversation selected at display region 740. Similar to the displays regions shown in FIG. 6B, information 706, 708 associated with retrieved voicemail information is displayed at display regions 704 of display regions 700, 720.

In some embodiments, when the information retrieved by information retrieval component 204 is displayed, the portion of the display region 700, 720 for displaying the conversations is adjusted to a new position on the UI to provide the display region 704 in a region that is non-overlapping with the region in which the conversations are displayed. However, as described with reference to FIG. 6B, the search results can be displayed overlaying, or overlapping, one or more of the conversations.

In some embodiments, when the information retrieval component 204 searches the item but finds no information associated with the item (i.e., no search results are retrieved), such as with display region 740, the information retrieval component 204 can display a symbol indicating that no search results has been found (as shown at 710) or the information retrieval component 204 can forgo displaying any search results, information or messages.

While the presence or absence of voicemail has been a focus for the foregoing example, as stated above, in various embodiments, any number of types of information can be retrieved for a conversation or for any other item. For example, messaging details can be retrieved.

Additionally, while the items discussed thus far have been primarily conversations, in various embodiments, any number of different types of items can be displayed by the UI and information retrieved by the information retrieval component 204. For example, by way of mere example, and not limitation, the item can be a search result or a listing of search results.

FIGS. 8A and 8B illustrate the information retrieval component 204 functionality for a listing of search results. As shown in FIG. 8A, the communication device 200 can generate search results based on any number of search terms manually entered at the text box 802. Display region 800 can include the listing of search results 812. FIG. 8A can display the search result in the order predetermined by the communication device 200.

In various embodiments, however, the display region can include indicia for sorting or organizing search results as shown at 814. By way of example, but not limitation, the indicia can include organizing search results by picks 804, ratings 806 or distance 808. Other manners of organizing and sorting information can also be provided by the communication device 200 and the above are merely exemplary.

Upon selecting the distance item 808, the information retrieval component 204 can search the information associated with the search results and organize the search results according to distance from the communication device 200. The organized list is as shown in display region 820. As such, the organized listed can be retrieved by the information retrieval component 204. The information retrieval component can display the information in the organized list according to distance while the distance item 808 is selected.

While the general operation of the information retrieval component 204 has been discussed, specific methods can be discussed with reference to FIGS. 3 and 4, methods 300 and 400 as provided below.

Figure 3:
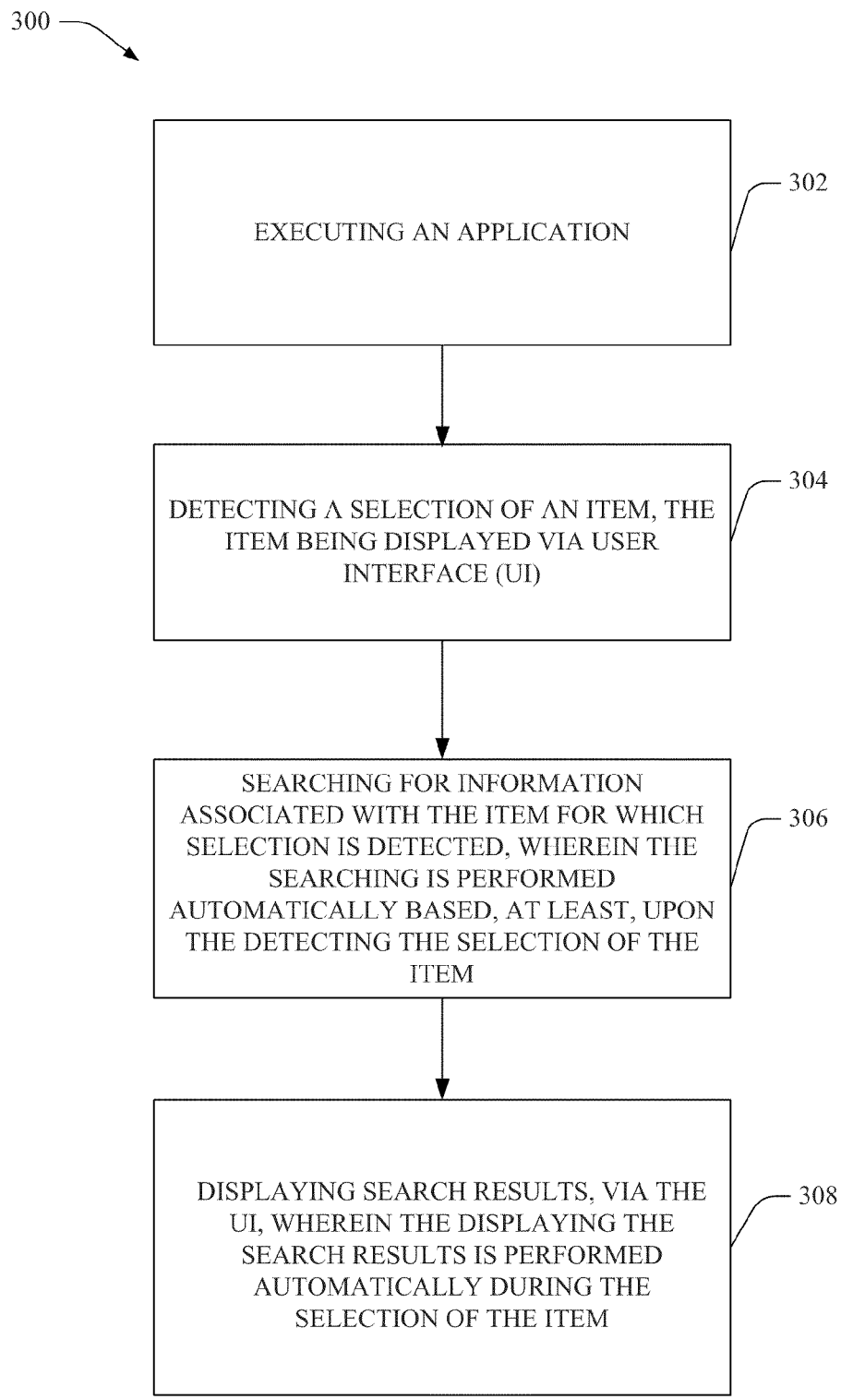
FIGS. 3 and 4 illustrate exemplary flowcharts of methods that facilitate information retrieval in accordance with aspects described herein.

With reference to FIG. 3, at 302, method 300 can include executing an application. In some embodiments, the method 300 can include executing a searching application and/or a display application.

At 304, method 300 can include detecting a selection of an item. The item can be displayed via the UI. In some embodiments, detecting the selection of the item can comprise detecting at least one of: a scroll command associated with scrolling to the item for which selection is detected, an icon or cursor position corresponding to a location of the item for which selection is detected, an input to the UI corresponding to the item for which selection is detected or an input to the UI corresponding to a location of the item for which selection is detected. The scrolling can be vertical scrolling, horizontal scrolling. The inputs can be textual inputs, activation of the item based on providing pressure at a location corresponding to the item, or any other method for selecting an item on the UI.

At 306, method 300 can include searching for information associated with the item for which selection is detected, wherein the searching is performed automatically based, at least, upon the detecting the selection of the item.

At 308, method 300 can include displaying search results, via the UI, wherein the displaying the search results is performed automatically during the selection of the item. In various embodiments, the search results comprise at least one of: a voicemail associated with the item for which selection is detected; a number of voicemails associated with the item for which selection is detected; messaging details associated with the item for which selection is detected; at least a portion of text associated with the item for which selection is detected; contacts information associated with a sender or recipient of the item for which selection is detected; or social media information associated with a sender or recipient of the item for which selection is detected.

In various embodiments, the item is at least one of: one or more conversations, wherein the one or more conversations comprise at least one of a text message or a voice call; or a search result listing comprising a plurality of search results.

In various embodiments, the item is displayed over a first display region of the UI and the displaying the search results comprise displaying the search results over a second display region of the UI. In various embodiments, the first display region of the UI and the second display region are non-overlapping.

In various embodiments, during a time period of displaying the search results, the first portion of the display region comprises a first location and during a time period of not displaying the search results the first portion of the display region comprises a second location.

Figure 4:
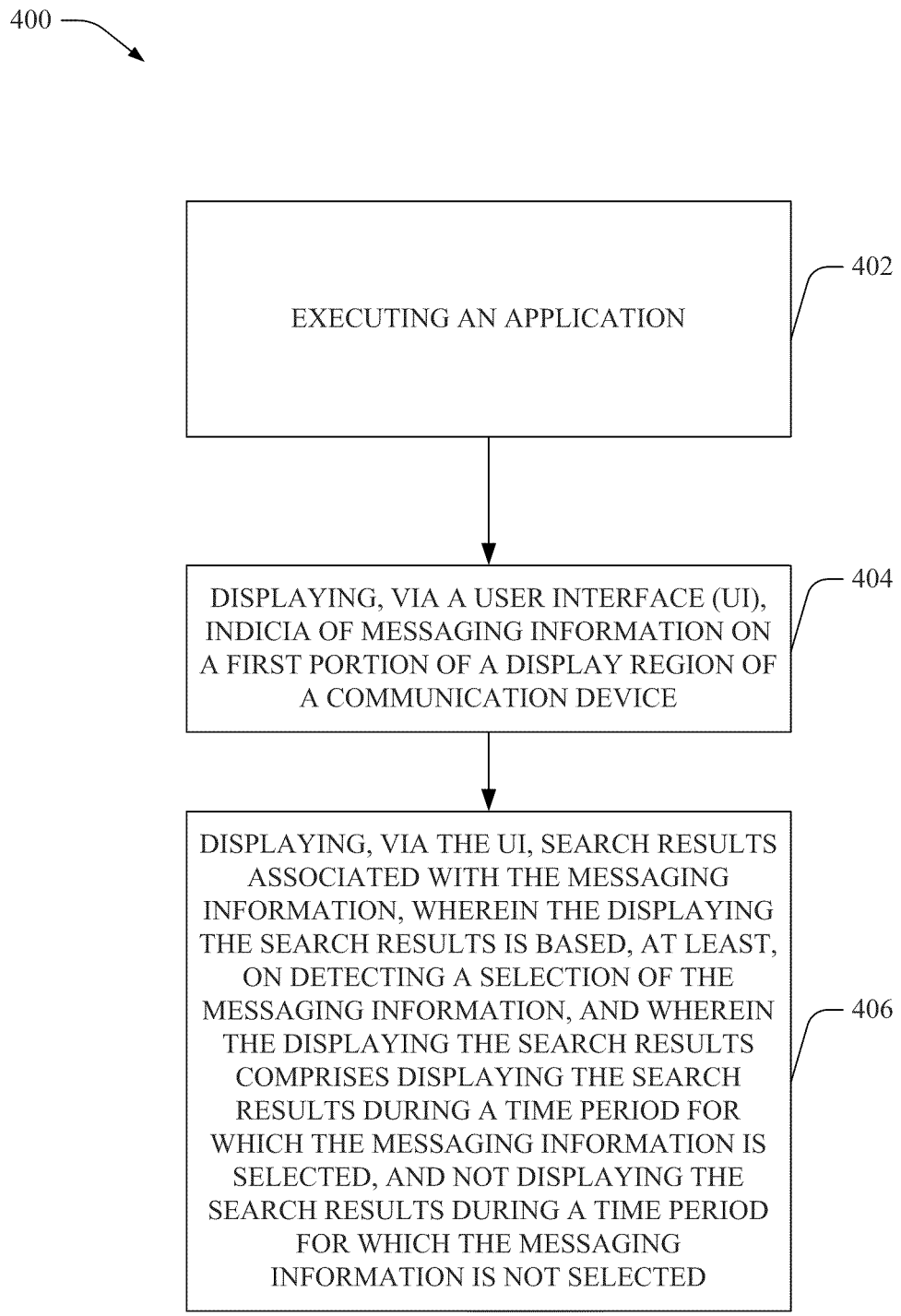

FIG. 4 is another method of providing information retrieval. At 402, method 400 can include executing an application. In some embodiments, the method 400 can include executing a searching application and/or a display application.

In various embodiments, at 404, method 400 can include displaying, via a user interface (UI), indicia of messaging information on a first portion of a display region of a communication device.

At 406, method 400 can include displaying, via the UI, search results associated with the messaging information, wherein the displaying the search results is based, at least, on detecting a selection of the messaging information, and wherein the displaying the search results comprises displaying the search results during a time period for which the messaging information is selected, and not displaying the search results during a time period for which the messaging information is not selected. In some embodiments, displaying information comprises displaying at least one of: indicia of whether one or more voicemails have not been reviewed and are associated with the messaging information for which selection is detected; or indicia of a number of voicemails that have not been reviewed and are associated with the messaging information for which selection is detected.

In some embodiments, the first portion of the display region corresponds to a first location during the time period while the messaging information is selected, and the first portion of the display region corresponds to a second location during the time period while the messaging information is not selected.

In some embodiments, displaying information comprises displaying at least one of: indicia of whether one or more voicemails have not been reviewed and are associated with the messaging information for which selection is detected; or indicia of a number of voicemails that have not been reviewed and are associated with the messaging information for which selection is detected.

In some embodiments, messaging information comprises a conversation thread comprising at least one text message.

Referring back to communication device 200, in various embodiments, the memory 208 and/or data store component 218 can store settings, parameter values and/or other information enabling information retrieval by the communication device 200. For example, parameter values can include values indicative of whether a voicemail is associated with a conversation, a number of voicemails associated with a conversation, details about messaging content in a conversation and the like. Details about messaging content can include, but is not limited to, a sender of the messaging content, the time and/or date that the messaging content was sent or received, a timestamp associated with the messaging content and/or content (e.g., image, audio, voicemail, telephone call) associated with specific messaging content.

The communication device 200 can include a memory 208 and/or data store component 218. The memory 208 and/or data store component 218 can store information and/or settings and/or computer-executable instructions for performing one or more functions described herein for the communication device 200. In various embodiments, the data store 218 that can store data structures (e.g., user data, application data, metadata); code structure(s) (e.g., modules, objects, classes, procedures) or instructions; message hashes; neighbor cell list; information relating to securing the communication device 200 and information associated therewith, displaying information in the UI display region, generating or displaying an overlay display region, generating or processing notifications and associated notification-related information; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor 206 can be functionally coupled (e.g., through a memory bus) to the data store 218 in order to store and retrieve information (e.g., neighbor cell list; information relating to securing the communication device 200 and information associated therewith, displaying information in the UI display region, generating or displaying an overlay display region, generating or processing notifications and associated notification-related information; frequency offsets; desired algorithms; etc.) desired to operate and/or confer functionality, at least in part, to, security component 204, UI component 202, overlay component 216 and/or substantially any other operational aspects or components of the communication device 200.

The communication device 200 can also include a contacts component 210 configured to control the operation of one or more contact applications. The contact applications can provide and/or enable display, deletion or editing contacts-related information. For example, contacts-related information can be associated with an item selected and displayed while the item is selected. The contacts-related information can include voice, email and/or geographical contact information associated with the item. As such, the contacts-related information can be mobile, home, work and/or fax numbers, email addresses, physical street addresses, social network identification information, a social network identification, or the like. The contacts-related information can also include information about the individual or the group including, but not limited to, biographical information such as the birthday or date of incorporation of the individual and group, respectively, favorite foods of an individual and/or other information specific to the individual or group that the user of the communication device 200 can want to access. The contacts-related information can include information that the user has stored locally on the communication device 200 (e.g., in the address book of the communication device 200) and/or that the user can access from a location that is remote from the physical location of the communication device 200.

The communication device 200 can also include a social media component 214 configured to control the receipt, aggregation, generation, output and/or filtering of social media information at the communication device 200. As such, the social media information can be stored in the data store component 218 and accessed by the information retrieval component 204.

By way of example, but not limitation, social media information can include, but is not limited to, information associated with or output from social media feeds, blog information, chat information, instant messaging information, and the like. The social media information can be displayed in any number of arrangements including, but not limited to, the subject matter of the social media feed, the social networking site from which the social media feed is provided and/or the chronological order of the social media feeds. In some embodiments, the social media information can include comments posted (or a number of comments posted) in association with one or more social media feeds for the individual. In some embodiments, one or more comments can be shown on the UI with the one or more feeds. The social media applications can include applications that provide social media feeds, news feeds and wall postings from FACEBOOK®, activity updates (e.g., tweets) from TWITTER® or other information from social networking sites such as MYSPACE®, websites of interest and the like.

In various embodiments as described herein and with reference to any number of different applications including, but not limited to, a messaging application, a contacts application and/or a social media application, where an entity, person or individual is discussed, the entity, person or individual can be a legal or natural entity, person or individual. Similarly, in various embodiments as described herein and with reference to any number of different applications including, but not limited to, a messaging application, a contacts application and/or a social media application, where an entity or group is discussed herein, the entity or group can include one or more legal or natural entities, persons or individuals. By way of example, but not limitation, an entity or group could be an organization, a business entity, a group of humans, and/or a group including a legal and a natural person or entity.

The communication device 200 can also include an application integration component (AIC) (not shown). In some embodiments, the AIC can include software and/or hardware configured to integrate one or more applications at an individual level or at a group level. Integrating one or more applications at an individual level can include retrieving and/or providing information specific to an individual. Integrating one or more applications at a group-level can include retrieving and/or providing information specific to a group or individuals of, or members of, the group. For example, the AIC can provide messaging, contacts and/or social media information about a specific individual or for a specific group or for specific members of a group.

In these embodiments, the AIC can enable the communication device 200 to be individual-targeted or group-targeted in provisioning of contact, messaging and/or social media information without requiring a user of the apparatus to enter individual applications for each of the contact, messaging and/or social media information.

As such, while the messaging component 212, contacts component 210 and/or the social media component 214 can allow the user of the communication device 200 to view messaging, contacts and social media information about one or more individuals or groups on a single display region of the UI, when the AIC integrates the messaging, contacts and/or social media application, the AIC can do such integration at an individual or group level. As such, upon integration, the messaging, contacts and/or social media information can be targeted towards a single individual and/or a single group. The targeted information can be information that displays details specific to or about the individual and/or group. Such targeted information can be displayed by the information retrieval component 204.

The communication device 200 also can include a processor 206. The processor 206 can enable the communication device 200 to process data and/or computer-executable instructions relating to information retrieval communication device 200 and information associated therewith, displaying information on the UI, generating or displaying an overlay display region, generating or processing notifications and associated notification-related information, and the like. In some embodiments, the processor 206 can be configured to execute computer-executable instructions to perform one or more of the functions described herein for the communication device 200, the information retrieval component 204, and the memory 208 can store the computer-executable instructions and/or information for performing the operations described herein.

In various embodiments, the processor 206 can be configured to confer functionality, at least in part, to substantially any component within the communication device 200, in accordance with aspects of the subject innovation. As another example, the processor 206 can facilitate enabling the communication device 200 to process data (e.g., symbols, bits, or chips) for multiplexing/demultiplexing, modulation/demodulation, such as implementing direct and inverse fast Fourier transforms, selection of modulation rates, selection of data packet formats, inter-packet times, and the like.

While the embodiments described herein are described with reference to a combination of two or more components, in various embodiments, one or more of the functions or structure (or part thereof) associated with the two or more components of the communication devices 102, 200 can be performed or provided in the information retrieval components 108, 204, respectively. Additionally, steps associated with various methods described herein that can be described with reference to different components or applications can be performed by a single component or application. Finally, multiple steps can be combined and performed in a single step, single steps can be performed as multiple steps, and steps described as being performed in sequence or parallel can be performed partly or completely in parallel or sequence, respectively.

Figure 9:
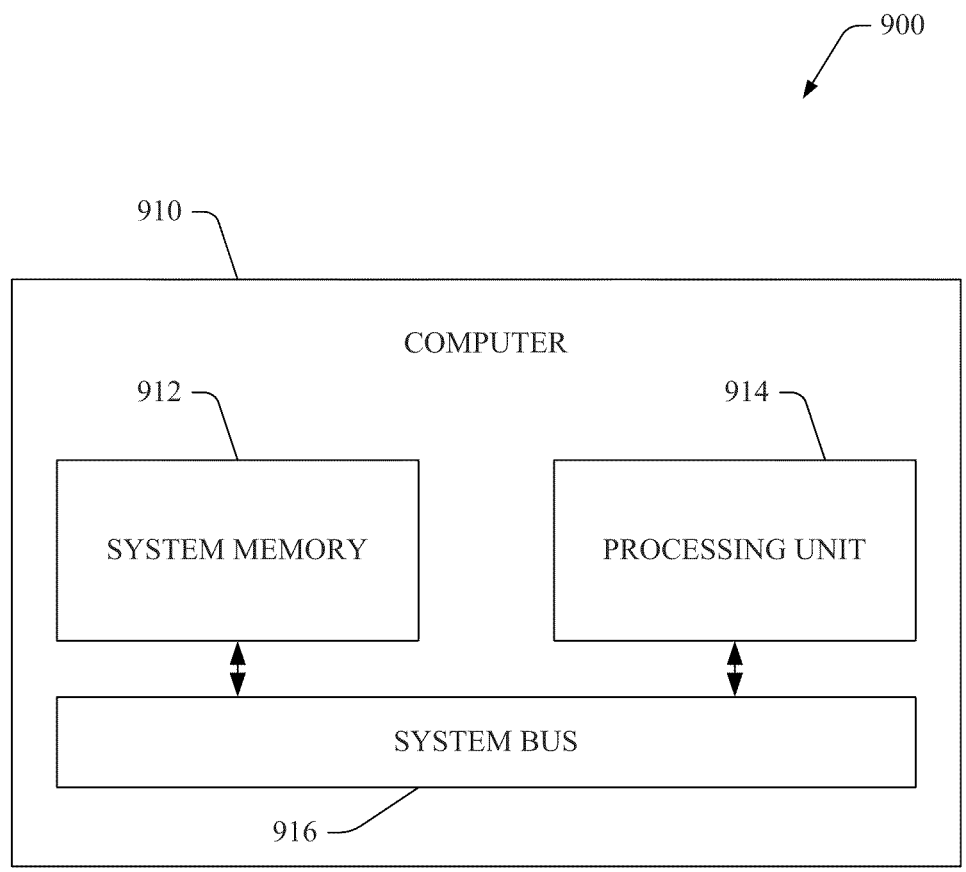
FIG. 9 illustrates an exemplary operating environment that facilitates the systems, apparatus, methods and computer-readable storage media described herein.

FIG. 9 illustrates an exemplary operating environment that facilitates the systems, apparatus and methods described herein. In order to provide additional context for various aspects of the embodiments described herein, FIG. 9 and the following discussion are intended to provide a brief, general description of a computing environment 900 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available media that can be accessed by a computing device and includes both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read-only memory (ROM), random access memory (RAM), Electrically Erasable Programmable Read-Only Memory (EEPROM), flash memory or other memory technology, compact disc read-only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communication media can embody computer-readable instructions, data structures, program modules and/or other structured or unstructured data in a data signal such as a modulated data signal, e.g., a carrier wave or other transport mechanism, and includes any information delivery or transport media. The term "modulated data signal" or "modulated data signals" refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media. Combinations of any of the above can also be included within the scope of communication media. In some embodiments, communication media are capable of subsequently propagating through electrically conductive media, (e.g., such as a system bus, microprocessor, data port, and the like) and/or non-electrically conductive media (e.g., in the form of radio frequency microwave frequency, optical frequency and similar electromagnetic frequency modulated data signals).

In accordance with various aspects, the computing environment 900 for implementing various aspects includes a computer 910, the computer 910 including a processing unit 914, a system memory 912 and a system bus 916. The system bus 916 couples system components including, but not limited to, the system memory 912 to the processing unit 914. The processing unit 914 can be any of various commercially available processors, such a single core processor, a multi-core processor, or any other suitable arrangement of processors. The system bus 916 can be any of several types of bus structure that can further interconnect to a memory bus (with or without a memory controller), a peripheral bus, and a local bus using any of a variety of commercially available bus architectures. The system memory 912 can include ROM, random access memory RAM, high-speed RAM (such as static RAM), erasable programmable read only memory (EPROM), EEPROM, flash memory, and/or the like. Additionally or alternatively, the computer 902 can include a hard disk drive, upon which program instructions, data, and the like can be retained. Moreover, removable data storage can be associated with the computer 910. Hard disk drives, removable media, computer-readable storage media, etc. can be communicatively coupled to the processing unit 914 by way of the system bus 916.

The system memory 912 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 910 through one or more wired/wireless input devices, such as a keyboard, pointing and clicking mechanism, pressure sensitive display region, microphone, joystick, stylus pen, etc. A monitor or other type of interface can also be connected to the system bus 916.

The computer 910 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 910 can connect to other devices/networks by way of antenna, port, network interface adaptor, wireless access point, modem, and/or the like.

The computer 910 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and BLUETOOTH® wireless technologies. Thus, the communication can be a predefined structure as with a conventional network or simply an ad hoc communication between at least two devices.

WiFi allows connection to the Internet from a desired location (e.g., couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 902.11 (a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
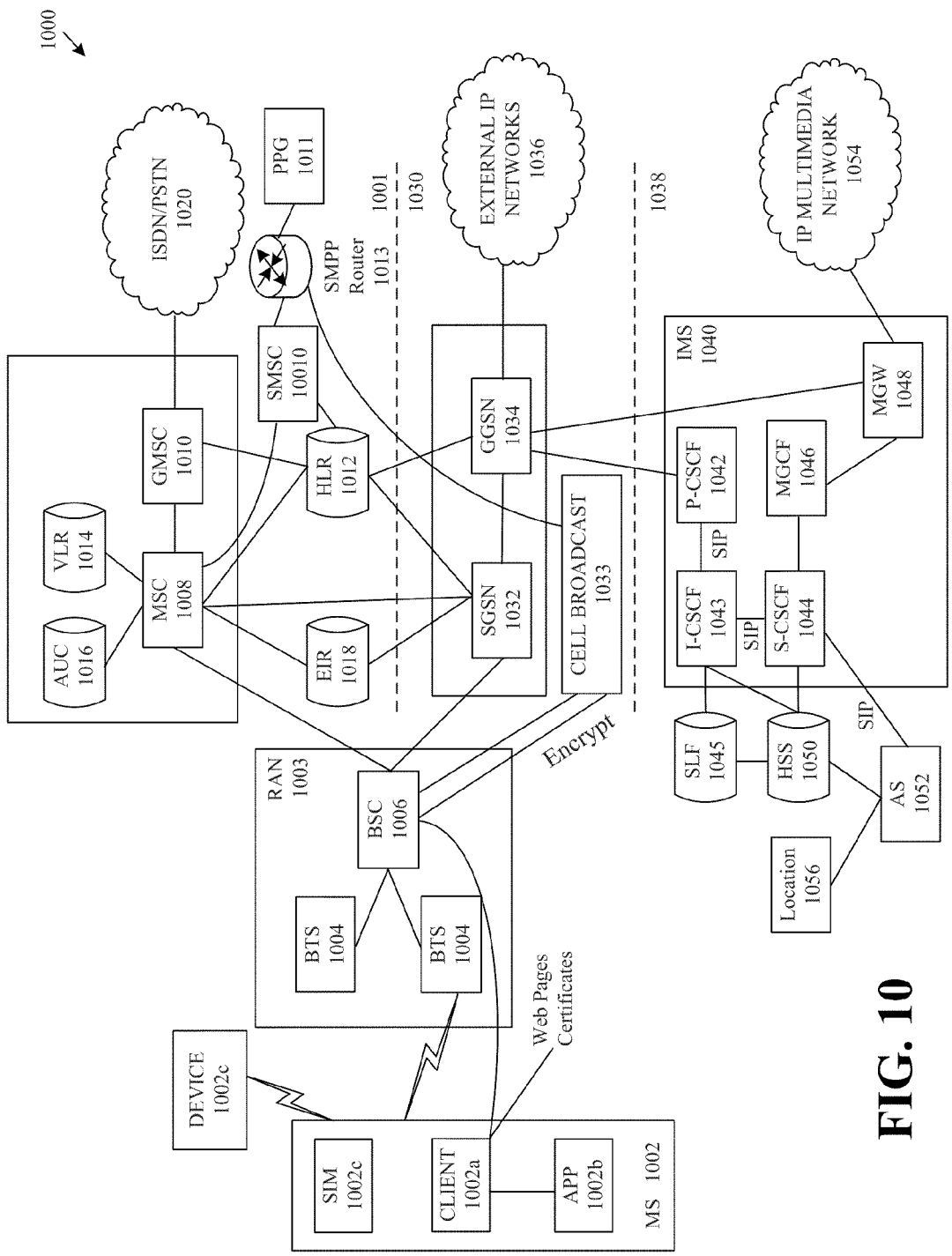
FIG. 10 illustrates an exemplary network environment that facilitates the systems, apparatus, methods and computer-readable storage media described herein.

FIG. 10 illustrates an exemplary network environment that facilitates the systems, apparatus and methods described herein. FIG. 10 depicts a GSM/General packet radio service (GPRS)/IP multimedia network architecture 1000 that includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) 1002c. The SIM 1002c includes an International Mobile Subscriber Identity (IMSI), which is a unique device identifier of a subscriber. The MS 1002 includes an embedded client 1002a that receives and processes messages received by the MS 1002. The embedded client 1002a can be implemented in JAVA and is discuss more fully below.

The embedded client 1002a communicates with an application (APP) 1002b that provides services and/or information to an end user. One example of the application can be navigation software that provides near real-time traffic information that is received via the embedded client 1002a to the end user. The navigation software can provide road conditions, suggest alternate routes, etc., based at least in part on the location of the MS 1002. Those of ordinary skill in the art understand that there are many different methods and systems of locating an MS 1002.

Alternatively, the MS 1002 and a device 1002c can be enabled to communicate via a short-range wireless communication link, such as BLUETOOTH® technologies. For example, a BLUETOOTH® SIM Access Profile can be provided in an automobile (e.g., device 1002c) that communicates with the SIM 1002c in the MS 1002 to enable the automobile's communications system to pull information from the MS 1002. The BLUETOOTH® communication system in the vehicle becomes an "embedded phone" that employs an antenna associated with the automobile. The result is improved reception of calls made in the vehicle. As one of ordinary skill in the art would recognize, an automobile is one example of the device 1002c. There can be an endless number of devices 1002c that use the SIM within the MS 1002 to provide services, information, data, audio, video, etc. to end users.

The BTS 1004 is physical equipment, such as a radio tower, that enables a radio interface to communicate with the MS. Each BTS can serve more than one MS. The BSC 1006 manages radio resources, including the BTS. The BSC can be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 10010 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. In embodiments, the GGSN provides interworking functionality with external networks, and sets up a logical link to the MS through the SGSN. When packet-switched data leaves the GPRS network, it is transferred to an external Transmission Control Protocol (TCP)-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (e.g., voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 can be common to the GSM network 1001, the GPRS network 1030 as well as the IP multimedia network 1038.

The IP multimedia system 1040 is built around the call/session control function (CSCF), of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 can also modify an outgoing request according to a set of rules defined by the network operator (e.g., address analysis and potential modification).

The I-CSCF 1043 forms an entrance to a home network and hides the inner topology of the home network from other networks and provides flexibility for selecting an S-CSCF. The I-CSCF 1043 can contact a subscriber location function (SLF) 1045 to determine which HSS 1050 to use for the particular subscriber, if multiple HSS 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISDN User Part (ISUP)/Bearer Independent Call Control (BICC) call control signaling from the external GSTN networks (not shown). It also controls the media gateway (MGW) 1048 that provides user-plane interworking functionality (e.g., converting between Adaptive Multi-Rate (AMR)- and Pulse-code modulation (PCM)-coded voice). The MGW 1048 also communicates with other IP multimedia networks 1054.

In some embodiments, the IP networks 1036 described herein include networks communicatively coupled to social networking sites. As such, the networks disclosed herein can also include such IP networks 1036 and one or more social networking sites.

It is to be appreciated and understood that components (e.g., UE, AP, core network, security component, UI, overlay component, etc.), as described with regard to a particular system or methodology, can include the same or similar functionality as respective components (e.g., respectively named components, similarly named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the subject specification, terms such as "data store," data storage," "database," "repository", and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include ROM, programmable ROM (PROM), EPROM, EEPROM, phase change memory (PCM), flash memory, or nonvolatile RAM (e.g., ferroelectric RAM (FeRAM)). Volatile memory can include RAM, which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "interface," "module," and the like can refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. As another example, an interface can include input/output (I/O) components as well as associated processor, application and/or API components, and can be as simple as a command line or as complex as an Integrated Development Environment (IDE). Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Furthermore, the embodiments can or can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. Computer-readable storage media can include, but are not limited to, magnetic storage devices (e.g., hard disk, floppy disk, magnetic strip), optical disks (e.g., compact disk (CD), DVD, Blu-ray disc (BD), . . . ), smart cards, and/or flash memory devices (e.g., card, stick, key drive). Additionally it should be appreciated that a carrier wave can carry computer-readable electronic data (e.g., the data transmitted and received via email and/or to access the Internet or a network such as a LAN). As known to those of ordinary skill in the art, modifications can be made to the above embodiments without departing from the spirit of the disclosure.

Moreover, the word "exemplary" is used herein to mean an example, instance or illustration. Any aspect or design described herein as "exemplary" is not to be construed as preferred or advantageous over other aspects or designs. Rather, use of the word "exemplary" is merely intended to present examples of embodiments. Further, as used herein, the term "or" is intended to mean an inclusive "or" rather than an exclusive "or". That is, unless specified otherwise, or clear from context, "X employs A or B" is intended to mean any of the inclusive permutations (e.g., X employs A, X employs B, X employs A and B). In addition, the articles "a" and "an," as used herein, should be construed to mean "one or more" unless, as specified otherwise, or clear from context, the articles are directed to only a singular form.

As used herein, the terms "infer" or "inference" refer generally to the process of reasoning about or inferring states of the system, apparatus, method, environment, and/or user from a set of observations as captured via events and/or data. By way of examples, but not limitation, inference can be employed to identify a specific context or action, or can generate a probability distribution over states. The inference can be probabilistic (e.g., the computation of a probability distribution over states of interest based on a consideration of data and events). Inference can also refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources.

What has been described above includes embodiments of claimed subject matter. It is, of course, not possible to describe every conceivable combination of components or methodologies for purposes of describing the claimed subject matter. However, one of ordinary skill in the art can recognize that many further combinations and permutations of such subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   displaying, by a display of a communication device comprising a processor, via a first interface at a first location, a group of text messages from third parties and associated with a user identity of the communication device;

detecting, by the communication device, a user selection of a text message of the group of text messages displayed via the first interface resulting in a selected text message, wherein the selected text message is displayed graphically distinguished from unselected ones of the group of text messages;

searching, by the communication device, for information associated with the selected text message, wherein the searching is performed in response to the detecting of the user selection of the text message;

maintaining, by the communication device, the displaying of the group of text messages via the first interface, comprising the selected text message, and while initiating, by the communication device, a concurrent display of a second interface, wherein the display of the first interface is moved to a second location, different than the first location, to provide space for the second interface in a region that is non-overlapping with the first interface; and displaying, by the communication device, a search result within the second interface, wherein the search result comprises numerical information indicative of a count of unread voicemails associated with a sender identity determined to be associated with the selected text message, wherein the concurrently displaying is performed in response to the user selection of the text message and wherein the second interface is removed from the display in response to the user detection of the selected text message resulting in the first interface returning to the first location.

2. The method of claim 1, wherein the detecting the user selection of the text message comprises detecting a scroll command associated with scrolling to the text message.

3. The method of claim 2, wherein the scrolling is vertical scrolling.

4. The method of claim 1, wherein the search result further comprises a portion of text associated with the text message.

5. The method of claim 1, wherein the detecting the user selection of the text message comprises detecting a cursor position corresponding to a location of the text message.

6. The method of claim 1, wherein the user selection of the text message is a first user selection of a first text message, and further comprising:

detecting, by the communication device, a second user selection of a second text message from the group of text messages.

7. The method of claim 6, wherein the second text message is different from the first text message.

8. The method of claim 6, wherein the search result is a first search result, and further comprising:

updating the second interface to concurrently display a second search result different than the first search result.

9. The method of claim 8, wherein the numerical information is first numerical information, and wherein the second search result comprises second numerical information different than the first numerical information.

10. The method of claim 9, wherein the second numerical information is indicative of a count of unread voicemails associated with a sender identity determined to be associated with the second text message.

11. A non-transitory machine-readable storage medium, comprising executable instructions that, when executed by a processor, facilitate performance of operations, comprising:

displaying, via a first interface at a first location on a display, a group of text messages from third parties and associated with a user identity of a communication device;

detecting, by the device, a user selection of a text message of the group of text messages displayed via the first interface resulting in a selected text message, wherein the selected text message is displayed graphically distinguished from unselected ones of the group of text messages;

searching, by the device, for information associated with the selected text message, wherein the searching is performed in response to the detecting of the user selection of the text message;

maintaining, via the first interface of the device, the display of the group of text messages via the first interface, comprising the selected text message, while initiating a concurrent display of a second interface, wherein the display of the first interface is moved to a second location, different than the first location, to provide space for the second interface in a region that is non-overlapping with the first interface; and displaying, by the device, a search result within the second interface, wherein the search result comprises numerical information indicative of a count of unread voicemails associated with a sender identity determined to be associated with the selected text message, wherein the concurrent display is performed in response to the user selection of the text message, and wherein the second interface is then removed from the concurrent display and the first interface returns to the first location in response to user de-selection of the selected text message.

12. The non-transitory machine-readable storage medium of claim 11, wherein the detecting the user selection of the text message comprises detecting a cursor position corresponding to a location of the text message.

13. An apparatus, comprising:

a processor;

a display; and a memory that stores executable instructions that, when executed by the processor, facilitate performance of operations, comprising:

displaying, on the display, via a first interface at a first location, a group of social networking messages from a group of third parties and associated with a user identity of the apparatus, wherein the group of social networking messages comprises feed information output from a social media feed;

detecting a user selection of a social networking message of the group of social networking messages resulting in a user selected social networking message, wherein the user selected social networking message is displayed graphically distinct from unselected ones of the group of social networking messages;

searching for voicemail information associated with the selected social networking message, wherein the searching is performed in response to the detecting the user selection of the social networking message; and maintaining the displaying of the group of the social networking messages via the first interface, comprising the user selected social networking message, while initiating a concurrent displaying of a second interface, wherein the displaying of the first interface is performed at a second location, different than the first location, to spatially accommodate the second interface in a region that is non-overlapping with the first interface;

displaying, a search result within the second interface, wherein the search result comprises numerical information indicative of a count of unread voicemails associated with a sender identity determined to be associated with the user selected social networking message, wherein the concurrently displaying is performed in response to the user selection of the social networking message, and wherein the second interface is removed from the display and the first interface returns to the first location in response to user de-selection of the user selected social networking message.

14. The apparatus of claim 13, wherein the detecting the user selection of the social networking message comprises detecting an input to the first interface corresponding to a location of the social networking message.

15. The apparatus of claim 14, wherein the detecting comprises detecting a scroll command associated with scrolling to the social networking message.

16. The apparatus of claim 15, wherein the scrolling comprises vertical scrolling.

17. The apparatus of claim 13, wherein the searching comprises determining contact information associated with a party identifier determined to be associated with the social networking message.

18. The apparatus of claim 13, wherein the search result further comprises a portion of text associated with the text message.

19. The apparatus of claim 13, wherein the detecting the user selection of the social networking message comprises detecting a cursor position corresponding to a location of the social networking message.

* * * * *